US012728363B1

(12) United States Patent
Chan et al.

(10) Patent No.: US 12,728,363 B1
(45) Date of Patent: Sep. 8, 2026

(54) TOY FIGURE WITH RECONFIGURABLE APPAREL PORTION

(71) Applicant: Mattel, Inc., El Segundo, CA (US)

(72) Inventors: Patricia Chan, Redondo Beach, CA (US); Steven D. Ryniker, Torrance, CA (US); Riki Yoshida, Torrance, CA (US)

(73) Assignee: MATTEL, INC., El Segundo, CA (US)

( * ) Notice: Subject to any disclaimer, the term of this patent is extended or adjusted under 35 U.S.C. 154(b) by 0 days.

(21) Appl. No.: 19/335,990

(22) Filed: Sep. 22, 2025

(51) Int. Cl.
*A63H 3/20* (2006.01)
*A63H 3/48* (2006.01)
*F16H 1/14* (2006.01)

(52) U.S. Cl.
CPC ................. *A63H 3/20* (2013.01); *A63H 3/48* (2013.01); *F16H 1/14* (2013.01)

(58) Field of Classification Search
CPC ... A63H 3/20; A63H 3/36; A63H 3/48; A63H 3/52; A63H 13/00; A63H 33/003; F16H 1/14
USPC .............. 446/97, 98, 99, 268, 321, 330, 376
See application file for complete search history.

(56) References Cited

U.S. PATENT DOCUMENTS

| | | | | |
|---|---|---|---|---|
| 2,380,175 A * | 7/1945 | Hawkey | A45B 3/00 | D21/594 |
| 3,147,566 A * | 9/1964 | Ong | A63H 3/18 | 446/377 |
| 3,648,405 A * | 3/1972 | Tepper | A63H 3/20 | 446/330 |
| 4,568,304 A * | 2/1986 | Santa Maria | A63H 3/12 | 446/330 |
| 4,601,672 A * | 7/1986 | Cook | A63H 3/20 | 446/330 |
| 4,623,318 A * | 11/1986 | Tsiknopoulos | A63H 3/48 | 446/236 |
| 4,723,932 A * | 2/1988 | Kelley | A63H 3/20 | 446/376 |
| 4,968,280 A * | 11/1990 | Kelley | A63H 3/20 | 446/338 |
| 4,995,846 A * | 2/1991 | Mariol | A63H 3/46 | 446/376 |
| 6,022,263 A * | 2/2000 | Liu | A63H 3/20 | 446/379 |
| 6,142,845 A * | 11/2000 | Feldman | A63H 33/28 | 446/16 |
| 6,261,148 B1 * | 7/2001 | Robinson | A63H 13/00 | 446/298 |
| 7,175,496 B1 * | 2/2007 | Lund | A63J 7/005 | 446/28 |
| 8,057,276 B2 * | 11/2011 | O'Connor | A63H 13/08 | 446/435 |
| 8,133,090 B2 * | 3/2012 | Hardin | A63H 3/50 | 446/268 |

(Continued)

*Primary Examiner* — Alexander R Niconovich
(74) *Attorney, Agent, or Firm* — Edell, Shapiro & Finnan, LLC

(57) ABSTRACT

A toy figure includes an upper portion and a lower portion, with each of the upper portion and the lower portion being rotatable relative to the other one of the upper portion and the lower portion. The toy figure includes a reconfigurable apparel portion that includes an apparel section with a first side having a first pattern and a second side having a second pattern, the second pattern being different from the first pattern.

20 Claims, 39 Drawing Sheets

(56) References Cited

U.S. PATENT DOCUMENTS

| | | | | |
|---|---|---|---|---|
| 8,506,344 | B2 * | 8/2013 | Chan | A63H 3/52 446/268 |
| 8,777,688 | B2 * | 7/2014 | Barthold | A63H 33/003 446/330 |
| 9,084,942 | B2 * | 7/2015 | O'Hare | A63H 3/46 |
| 9,101,846 | B2 * | 8/2015 | Chan | A63H 3/00 |
| 9,168,462 | B2 * | 10/2015 | Jung | A63H 3/48 |
| 9,259,659 | B2 * | 2/2016 | Sopinsky | A63H 13/06 |
| 9,616,353 | B2 * | 4/2017 | Chan | A63H 3/52 |
| 9,724,615 | B2 * | 8/2017 | Chan | A63H 3/28 |
| 10,786,745 | B2 * | 9/2020 | Chan | A63H 3/20 |
| 11,235,253 | B2 * | 2/2022 | Towne | A63H 3/36 |
| 11,426,668 | B1 * | 8/2022 | Reiner | A63H 3/52 |
| 11,992,783 | B2 | 5/2024 | O'Brien et al. | |
| 12,011,675 | B1 * | 6/2024 | Schuyler | A63H 33/003 |
| 2007/0232186 | A1 * | 10/2007 | Shamah | A63H 3/005 446/369 |
| 2009/0253347 | A1 * | 10/2009 | Byrd | A63H 3/20 446/321 |
| 2012/0129422 | A1 * | 5/2012 | Chuang | A63H 3/20 446/330 |
| 2018/0229133 | A1 * | 8/2018 | Law | A63H 3/20 |
| 2020/0238185 | A1 * | 7/2020 | Towne | A63H 3/36 |
| 2022/0105437 | A1 * | 4/2022 | Towne | A63H 3/52 |

* cited by examiner

TOY FIGURE WITH RECONFIGURABLE APPAREL PORTION

TECHNICAL FIELD

The present application relates generally to a toy figure and, in particular, to a toy figure with a reconfigurable apparel portion that may be transformed between different configurations.

BACKGROUND

Toys provide entertainment for different users, such as children. For example, a toy may include various features with which a child may play. An example toy that may entertain a child is a toy figure, such as a doll. Toy figures have been popular for many years. Conventional toy figures typically have static appearances that cannot be changed during play. Some toy figures may include removable clothing or accessories, but these require manual removal and replacement of separate pieces that can be easily lost.

Thus, there is a need for a toy figure that can be easily reconfigured by a child to provide enhanced play opportunities.

SUMMARY

A toy figure according to the aspects presented herein includes a reconfigurable apparel portion coupled to a body of the toy figure. The reconfigurable apparel portion can be transformed or moved to different configurations to change the appearance of the toy figure.

In one aspect of the present disclosure, a toy figure comprises a body having an upper portion and a lower portion rotatably coupled to the upper portion, and a reconfigurable apparel portion. The reconfigurable apparel portion includes a first apparel section and a second apparel section, each of the first apparel section and the second apparel section has a longitudinal axis, and each of the first apparel section and the second apparel section is rotatable about its longitudinal axis when one of the lower portion or the upper portion rotates relative to the other of the lower portion or the upper portion.

In one embodiment, one of the upper portion or the lower portion includes a first gear coupled thereto, each of the first apparel section and the second apparel section includes its own gear, and teeth of the first apparel section gear and teeth of the second apparel section gear engage teeth of the first gear.

In another embodiment, rotation of one of the lower portion or the upper portion relative to the other of the lower portion or the upper portion causes the first apparel section gear and the second apparel section gear to rotate relative to the first gear.

In an alternative embodiment, the first gear is a crown gear with teeth oriented downward, the first gear being coupled to the lower portion, the first apparel section gear and the second apparel section gear are beveled gears, and each of the first apparel section gear and the second apparel section gear are coupled to the upper portion.

In yet another embodiment, the first apparel section includes a first rotatable support defining a first longitudinal axis, the first apparel section gear is mounted on the first rotatable support, and the first rotatable support and the first apparel section gear are rotatable about the first longitudinal axis.

In another embodiment, the upper portion has a second longitudinal axis about which it is rotatable, the lower portion has a third longitudinal axis about which it is rotatable, and the first longitudinal axis extends relative to each of the second longitudinal axis and the third longitudinal axis at an orientation other than being either perpendicular or parallel to either of the second longitudinal axis or the third longitudinal axis.

In one embodiment, the first apparel section has a first side with a first pattern and a second side with a second pattern, and the second pattern being different from the first pattern.

In another embodiment, the second apparel section has a third side with a third pattern and a fourth side with a fourth pattern, and the fourth pattern being different from the third pattern, and wherein the first pattern is the same as the third pattern, and the second pattern is the same as the fourth pattern.

In yet another embodiment, the first apparel section and the second apparel section rotate simultaneously with each other so that the first side is oriented upwardly when the third side is oriented upwardly.

In an alternative embodiment, the reconfigurable apparel portion has a first configuration in which the first side and the third side are oriented upwardly and in which the second side and the fourth side are oriented downwardly, and the reconfigurable apparel portion has a second configuration in which the second side and the fourth side are oriented upwardly and in which the first side and the third side are oriented downwardly.

In another embodiment, when the upper portion and the lower portion are in a first arrangement, the reconfigurable apparel portion is in its first configuration, and when one of the lower portion or the upper portion is rotated a full revolution relative to the other of the lower portion or the upper portion, the upper portion and the lower portion are in a second arrangement in which the reconfigurable apparel portion is in its second configuration.

In yet another embodiment, the reconfigurable apparel portion includes a third apparel section, a fourth apparel section, and a fifth apparel section, each of the first apparel section, the second apparel section, the third apparel section, the fourth apparel section, and the fifth apparel section is mounted to the upper portion and located around a perimeter of the body of the toy figure, and the first apparel section, the second apparel section, the third apparel section, the fourth apparel section, and the fifth apparel section collectively form clothing for the toy figure.

In another embodiment, when the lower portion rotates about its longitudinal axis relative to the upper portion, each of the first apparel section and the second apparel section rotates about its longitudinal axis and does not revolve around the longitudinal axis of the lower portion, and when the upper portion rotates about its longitudinal axis relative to the lower portion, each of the first apparel section and the second apparel section rotates about its longitudinal axis and revolves around the longitudinal axis of the lower portion as well.

In another aspect of the present disclosure, a toy figure comprises an upper body portion, a lower body portion rotatably coupled to the upper body portion, and a reconfigurable apparel portion coupled to one of the upper body portion and the lower body portion, the reconfigurable apparel portion including apparel sections, each apparel section including a support and a material coupled to its support, each support defining a longitudinal axis about which that support and its respective material rotates, and each apparel section rotates about its longitudinal axis when one of the lower body portion or the upper body portion rotates relative to the other of the lower body portion or the upper body portion.

In one embodiment, the lower body portion has a crown gear coupled thereto, each apparel section has a beveled gear coupled its respective support, and each apparel section beveled gear engages the lower body portion crown gear.

In another embodiment, rotation of one of the lower body portion or the upper body portion relative to the other of the lower body portion or the upper body portion causes each of the apparel sections to rotate about its longitudinal axis simultaneously with other apparel sections rotating about their longitudinal axes.

In an alternative embodiment, rotation of the upper body portion about its longitudinal axis relative to the lower body portion causes each of the apparel sections to revolve around its longitudinal axis of the lower body portion as well.

In yet another embodiment, each apparel section material includes a first side with a first pattern and a second side with a second pattern, the second pattern being different from the first pattern, and each apparel section rotates simultaneously with other apparel sections so that a first side of each apparel section is oriented in the same direction as the first sides of other apparel sections.

In another aspect of the present disclosure, a toy figure comprises an upper body portion defining a longitudinal axis, a lower body portion rotatably coupled to the upper body portion, and a reconfigurable apparel portion including a plurality of apparel sections, each apparel section including a support with a gear mounted thereon and a multiple-sided material coupled to the support, each support defining its own longitudinal axis about which its respective multiple-sides material rotates, each apparel section rotating about its longitudinal axis when one of the lower body portion or the upper body portion rotates relative to the other of the lower body portion or the upper body portion, and each apparel section revolves about the longitudinal axis of the upper body portion when the upper body portion rotates relative to the lower body portion.

In one embodiment, material of each apparel section includes a first side with a first pattern and a second side with a second pattern, the second side being opposite the first side, and the second pattern being different from the first pattern, and the first side of each apparel sections is oriented in the same direction as the first sides of other apparel sections when the plurality of apparel sections rotate.

BRIEF DESCRIPTION OF THE DRAWINGS

The toy figure presented herein may be better understood with reference to the following drawings and description. Unless dimensions of elements of the drawings are specifically called-out and described herein, it should be understood that the elements in the figures are not necessarily to scale and that emphasis has been placed upon illustrating the principles of the toy figure. In the figures, like-referenced numerals designate corresponding parts throughout the different views.

DETAILED DESCRIPTION

In a toy figure according to the aspects disclosed herein, a toy figure includes an upper portion and a lower portion, with each of the upper portion and the lower portion being rotatable relative to the other one of the upper portion and the lower portion. The toy figure includes a reconfigurable apparel portion that includes an apparel section with a first side having a first pattern and a second side having a second pattern, the second pattern being different from the first pattern.

In one embodiment, a toy figure has an upper portion and a lower portion that are rotatably coupled together. The toy figure includes a reconfigurable apparel portion with one or more apparel sections. The reconfigurable apparel portion is transformable between different configurations through rotation of apparel sections.

In another embodiment, a toy figure includes one or more gears that are configured to transmit rotational movement of either the upper portion or the lower portion to one or more apparel sections of a reconfigurable apparel portion. The apparel sections are rotatable about their respective longitudinal axes to display different patterns or visual configurations.

In one embodiment, the apparel sections or portions of the toy figure rotate about their longitudinal axes when the lower portion of the toy figure is rotated relative to the upper portion of the toy figure. In addition, the apparel sections or portions of the toy figure rotate about their longitudinal axes and also revolve or orbit around the toy figure when the upper portion of the toy figure is rotated relative to the lower portion of the toy figure.

Figure 1:
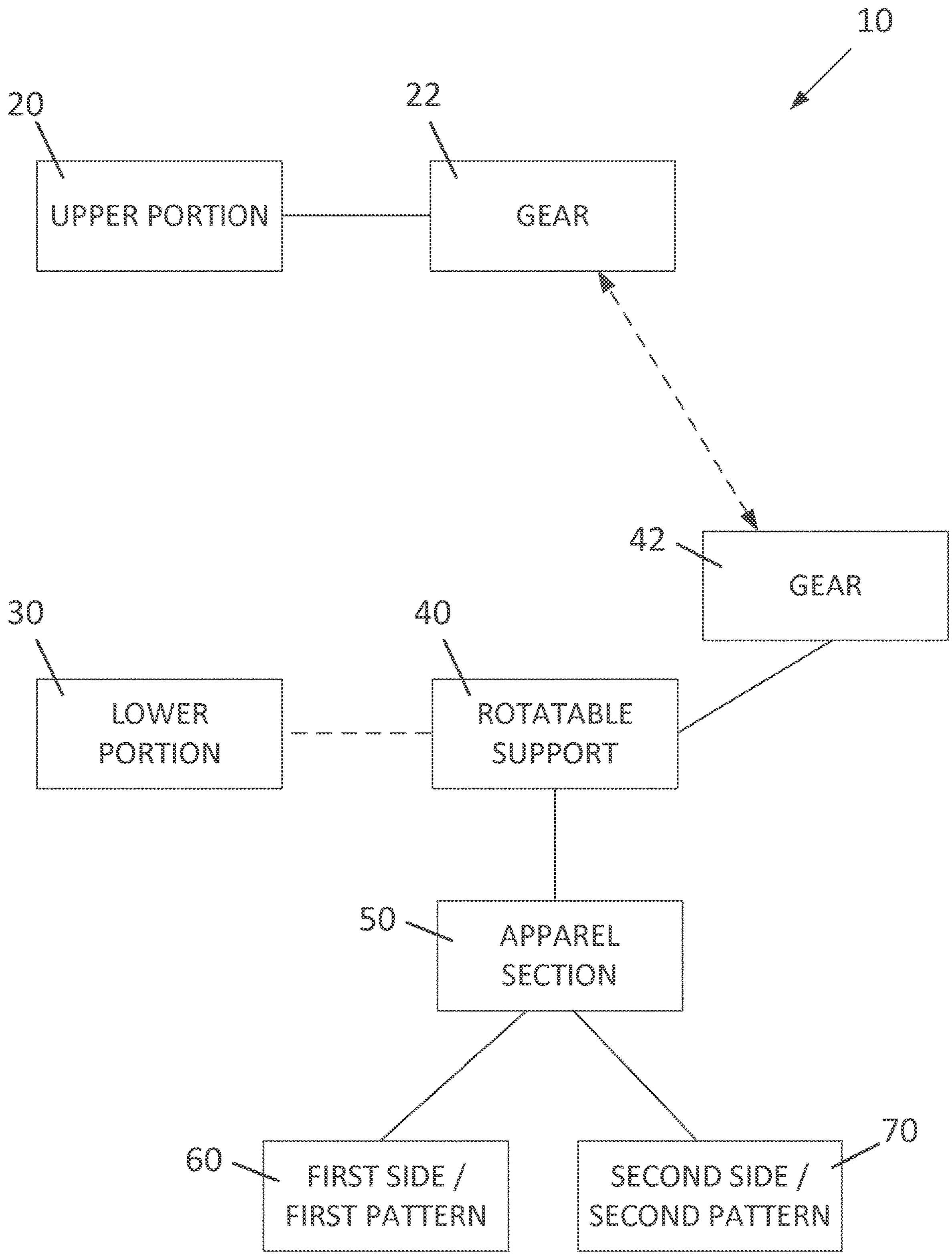
FIG. 1 illustrates a schematic block diagram of an embodiment of a toy figure according to the present disclosure.
Figure 10:
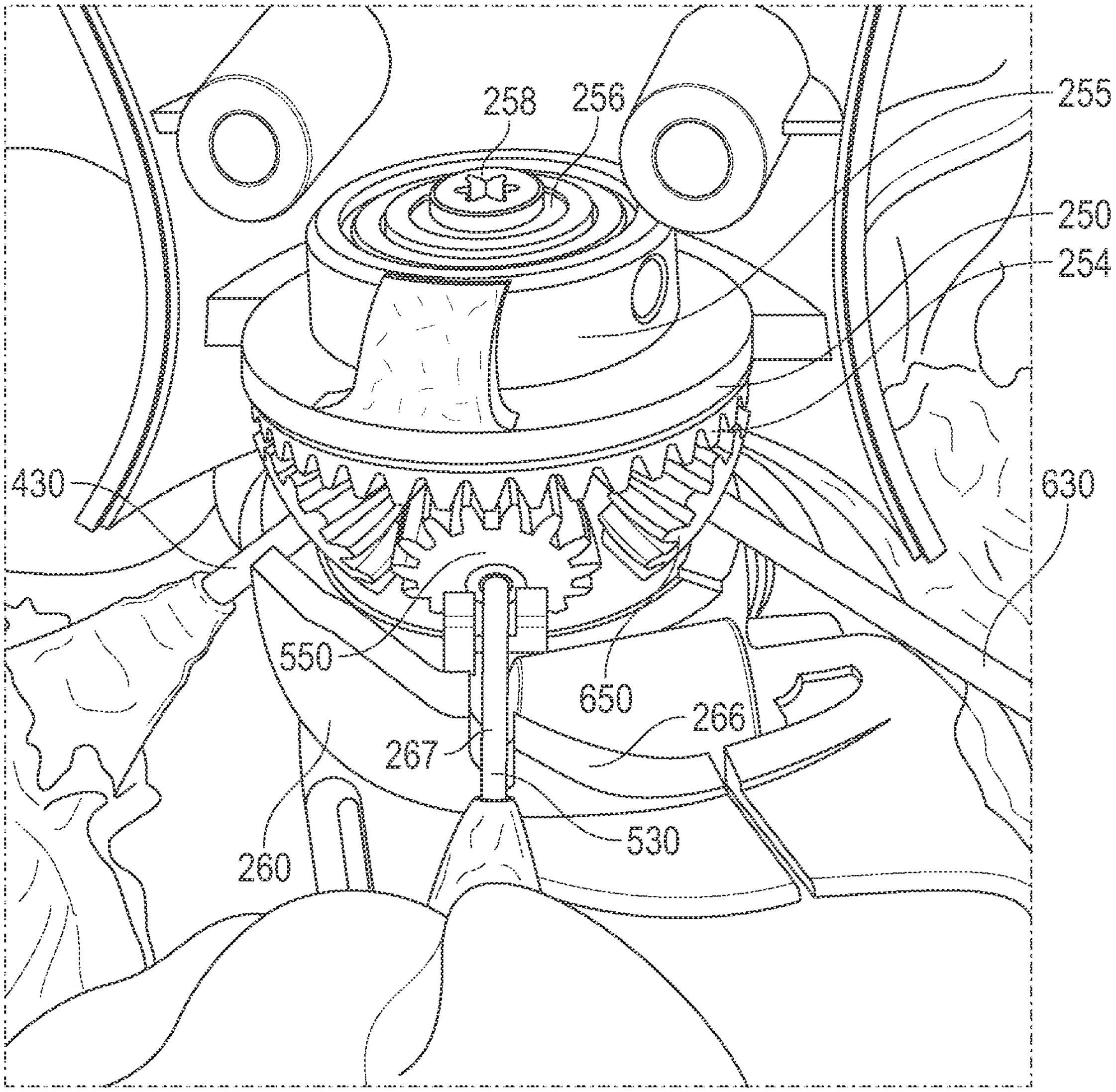
FIG. 10 illustrates a close-up side view of some of the internal components of the toy figure of FIG. 9.

Initially turning to FIG. 1, a toy figure 10 includes an upper portion 20 and a lower portion 30. The toy figure 10 can be a doll, a figure, an action figure, or a character. The upper portion 20 can be referred to alternatively as an upper body portion. Similarly, the lower portion 30 can be referred to alternatively as a lower body portion. In one implementation, the upper portion 20 includes a torso, arms, and a head of a toy figure, and the lower portion 30 includes a waist portion, legs, and feet of the toy figure.

In one embodiment, the upper portion 20 includes a gear 22 that has teeth. The toy figure 10 includes a rotatable support 40 that is movable relative to the upper portion 20 and to the lower portion 30. The rotatable support 40 has a longitudinal axis about which it rotates. In one implementation, the rotatable support 40 is located between the upper portion 20 and the lower portion 30. The rotatable support 40 includes a gear 42 that has teeth. Gear 42 is engaged with gear 22 so that the teeth of gear 42 engage the teeth of gear 22. Thus, when one of the upper portion 20 or the lower portion 30 of the toy figure 10 is rotated relative to the other of the upper portion 20 or the lower portion 30, the engagement of gear 22 with gear 42 causes the rotatable support 40 to rotate as well. In different modes of play, either of the upper portion 20 or the lower portion 30 may be rotated relative to the other one to cause the rotatable support 40 to rotate.

The toy figure 10 includes an apparel section 50 that is coupled to the rotatable support 40. The apparel section 50 has a first side 60 with material having a first pattern and a second side 70 with material having a second pattern. Thus, when the upper portion 20 or the lower portion 30 is rotated relative to the other, the engagement of gears 22 and 42 causes the rotatable support 40 and the apparel section 50 to rotate, which in turn causes one of the first side 60 or the second side 70 to be oriented in a particular direction or orientation.

In one embodiment, the first pattern and the second pattern are different from each other. For example, the first pattern and the second patter may be visually distinguishable from each other, such as by color and/or indicia. Alternatively, the first pattern and the second pattern may have different tactile properties from each other. In one embodiment, the first side 60 and the second side 70 are on opposite sides of the apparel section 50 from each other. In various embodiments, the toy figure 10 may have multiple apparel sections 50, each of which has its own first side 60 having a first pattern and its own second side 70 having a second pattern.

Figure 2:
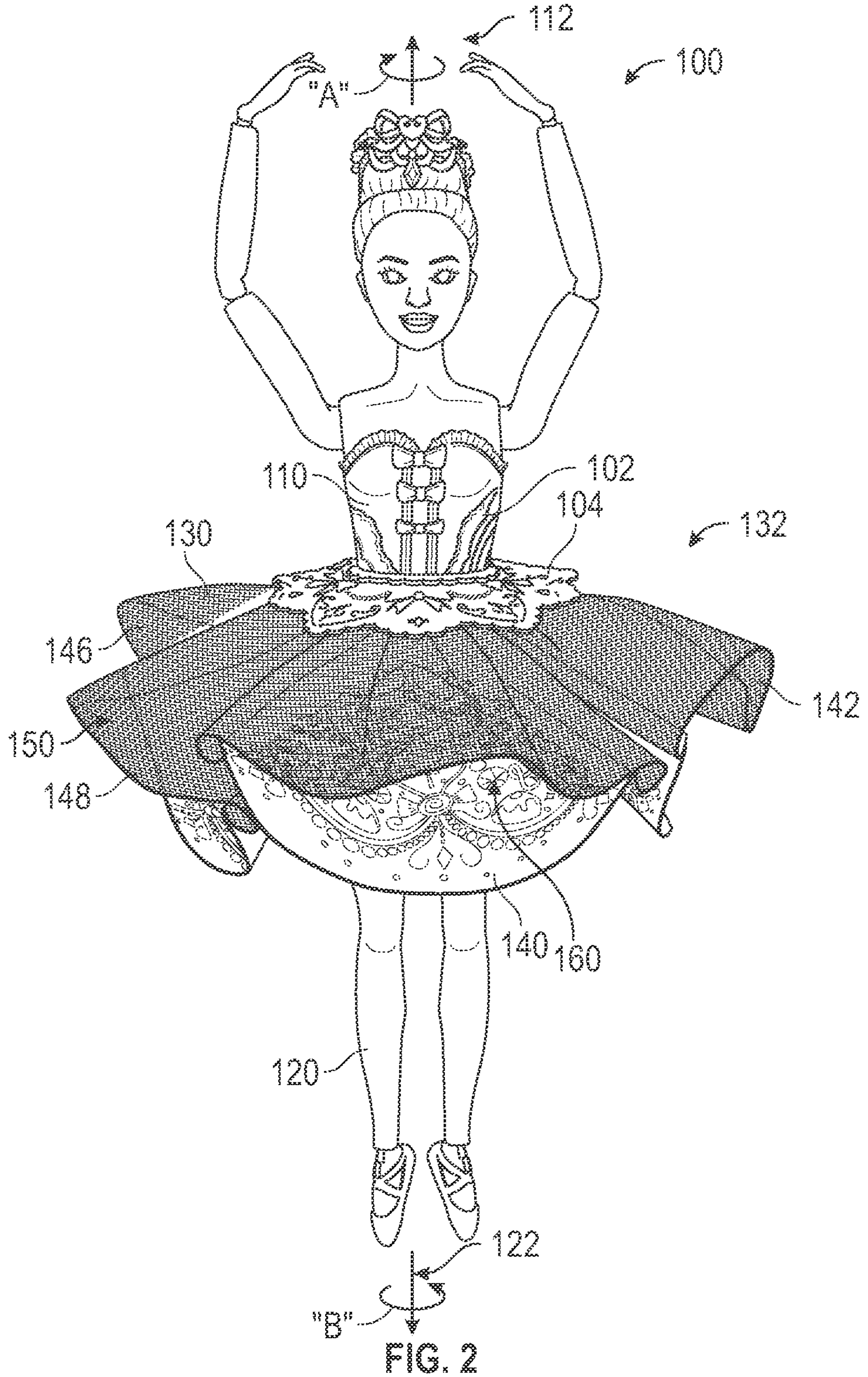
FIG. 2 illustrates a front view of an embodiment of a toy figure having a reconfigurable apparel portion in a first configuration according to the present disclosure.
Figure 3:
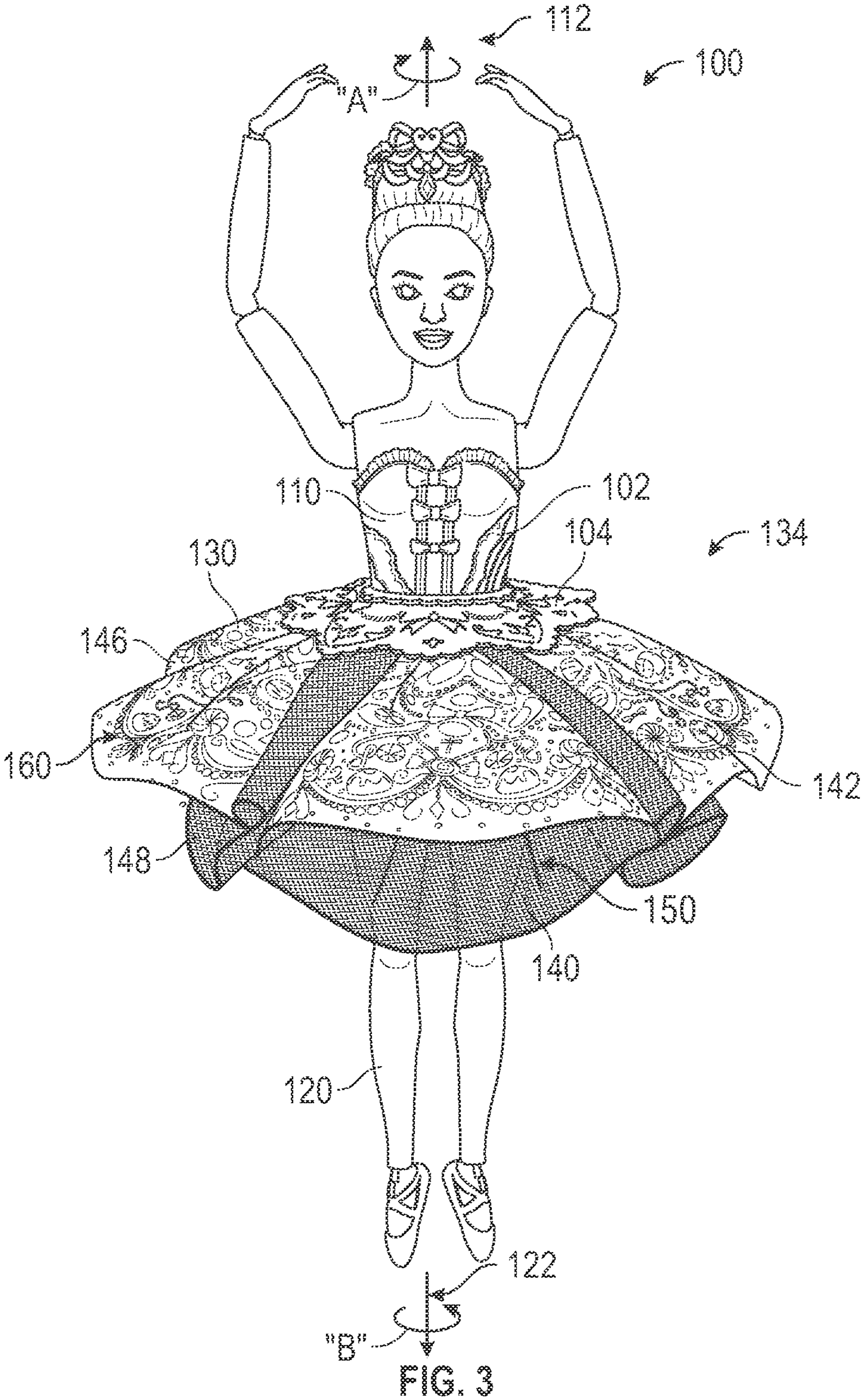
FIG. 3 illustrates a front view of the toy figure of FIG. 2 with its reconfigurable apparel portion in a second configuration according to the present disclosure.

Referring to FIGS. 2 and 3, an embodiment of a toy figure according to the present invention is illustrated. In this embodiment, a toy figure 100 includes an upper portion or upper body portion 110 and a lower portion or lower body portion 120. The upper portion 110 and the lower portion 120 collectively form a body 102 of the toy figure 100. In this embodiment, the toy FIG. 100 includes a skirt portion 104 that extends radially outwardly from the body 102. The skirt portion 104 may be a molded plastic article with a decorative pattern of one or more grooves formed therein.

The upper portion 110 has a longitudinal axis 112 about which the upper portion 110 can rotate along the direction of arrow "A" or along the direction opposite to arrow "A". Similarly, the lower portion 120 has a longitudinal axis 122 about which the lower portion 120 can rotate along the direction of arrow "B" or along the direction opposite to arrow "B".

The toy figure 100 includes a reconfigurable apparel portion 130 that extends outwardly from the body 102 of the toy figure 100. In one embodiment, the reconfigurable apparel portion 130 is positioned between the upper portion 110 and lower portion 120 and is located close to the skirt portion 104. The reconfigurable apparel portion 130 can be transformed between different configurations. FIG. 2 shows the reconfigurable apparel portion 130 in a first configuration 132 and FIG. 3 shows the reconfigurable apparel portion 130 in a second configuration 134. The reconfigurable apparel portion 130 includes multiple apparel sections 140, 142, 146, and 148 that are located around a perimeter of the body 102 of the toy figure 100. The apparel sections 140, 142, 146, and 148 collectively form an article of clothing or apparel for the toy figure 100.

Each apparel section 140, 142, 146, and 148 includes different materials forming the apparel section. Each apparel section includes a first side 150 that has a first material having a first pattern and a second side 160 that has a second material having a second pattern. The first side 150 and the second side 160 are distinguishable from each other. In one embodiment, the first side 150 and the second side 160 have different visual appearances, which is accomplished by one or more of the following features: color, indicia, thickness, or texture. As shown in FIGS. 2 and 3, the material of the first side 150 has a single solid color and is thin enough to be seen through, and the material of the second side 160 has a multi-colored pattern and cannot be seen through. When the first sides 150 of the apparel sections are oriented upwardly (see FIG. 2), the toy figure 100 has a first configuration and a first visual appearance. When the second sides 160 of the apparel sections are oriented upwardly (see FIG. 3), the toy figure 100 has a second configuration and a second visual appearance, both of which are different than the first configuration and the first visual appearance, respectively.

Similar to that described below relative to other embodiments of toy figures according to the present disclosure, the toy figure 100 is changeable or transformable between its different configurations when one of the upper portion 110 or the lower portion 120 is rotated relative to the other of the upper portion 110 or the lower portion 120. When one of the upper portion 110 or the lower portion 120 is rotated, an internal mechanism of the toy figure 100 converts that rotational movement into rotation of the apparel sections 140, 142, 146, and 148 about their longitudinal axes simultaneously. As a result, either the material of the first side 150 or the material of the second side 160 can be displayed upwardly as desired.

Referring to FIGS. 4-11, another embodiment of a toy figure according to the present disclosure is illustrated. In this embodiment, as described below, a crown gear is connected to an upper portion of the body of the toy figure and apparel sections and beveled gears are connected to the lower portion of the body of the toy figure. As a result, the apparel sections rotate in place when the upper portion of the toy figure body is rotated, which moves the crown gear, thereby rotating the apparel sections. The apparel sections rotate and also revolve around the doll when the lower portion of the toy figure body is rotated relative to the upper portion of the toy figure body. The result is the beveled gears travel along a stationary crown gear.

Figure 4:
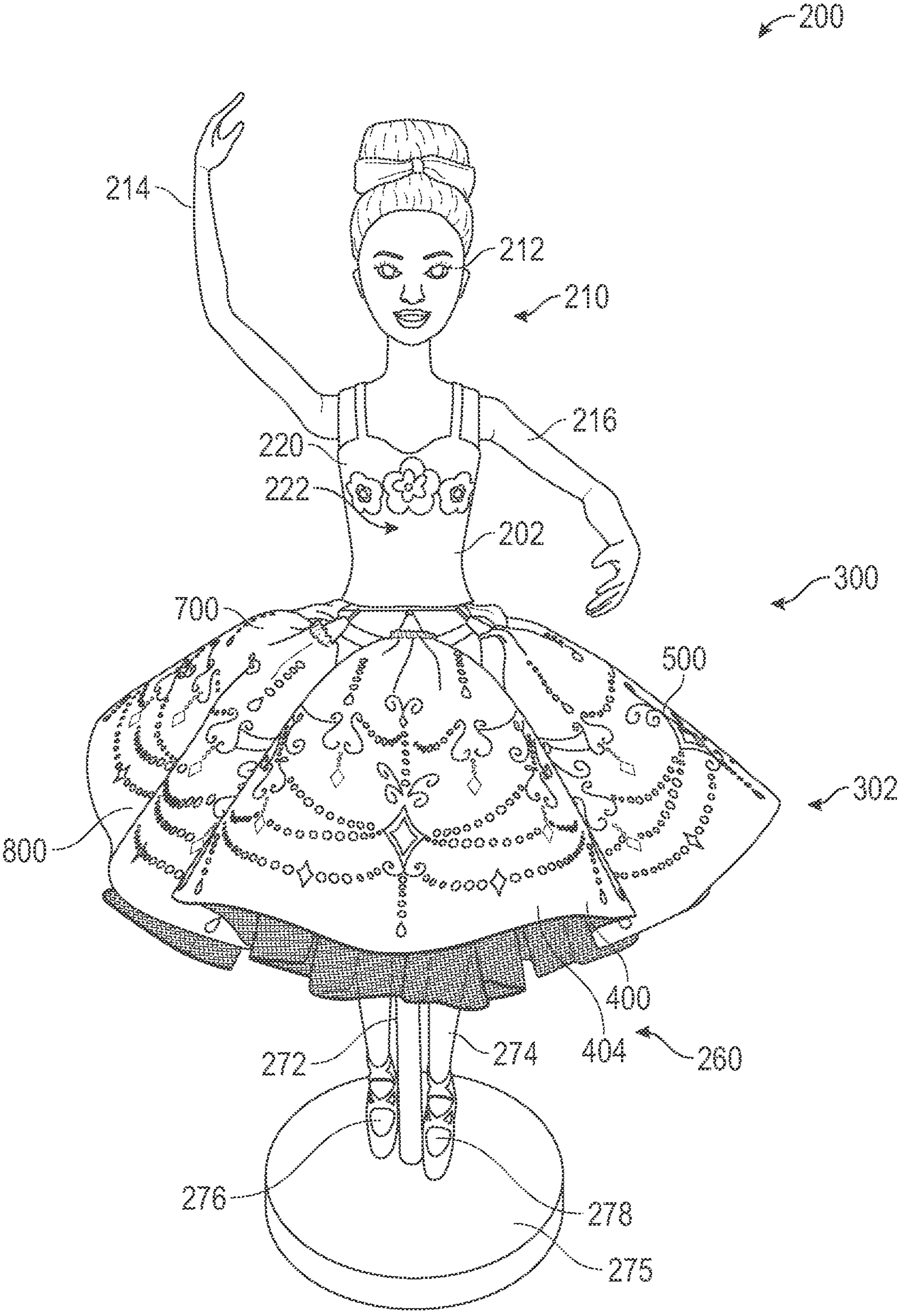
FIG. 4 illustrates a front view of another embodiment of a toy figure with having a reconfigurable apparel portion in a first configuration according to the present disclosure.

FIG. 4 illustrates a front view of a toy figure 200 with a body 202 having an upper portion 210 and a lower portion 260. The upper portion 210 includes a torso 220 with a head 212 and a pair of arms 214 and 216 coupled thereto. The torso 220 has a front side 222.

As shown in FIG. 4, toy figure 200 includes a reconfigurable apparel portion 300 that has a first configuration 302. The reconfigurable apparel portion 300 includes several apparel sections that are movably coupled to the body 202 of the toy figure 200. In this view, apparel sections 400, 500, 700, and 800 are visible. Apparel section 400 has a distal end 404 that is opposite to a proximal end, which is discussed in detail below. Each of the other apparel sections has a similar distal end and proximal end. The lower portion 260 includes legs 272 and 274 to which feet 276 and 278 are coupled, respectively. In one mode of play, the toy figure 200 can be used with a stand 275 that can support or hold the toy figure 200.

Figure 5:
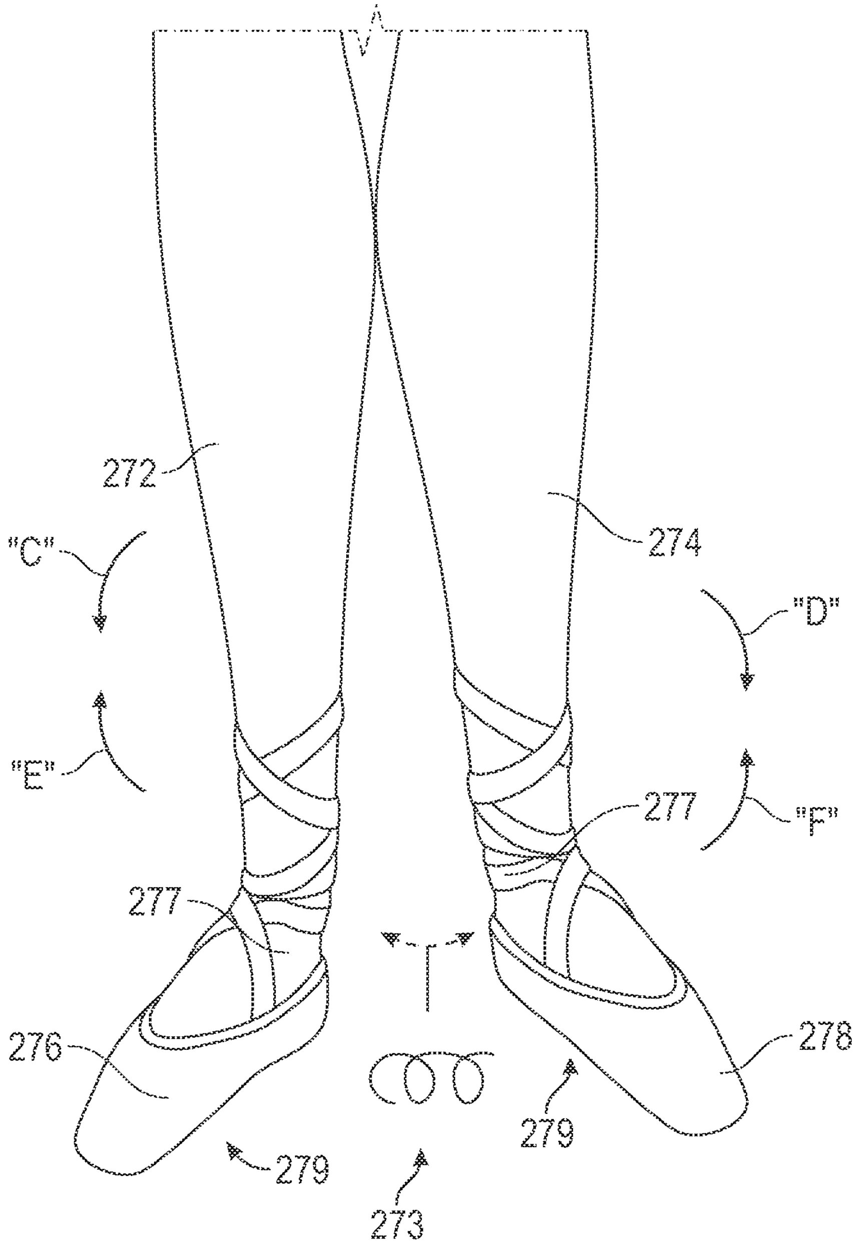
FIG. 5 illustrates a close-up front view of portions of the legs and feet of the toy figure of FIG. 4.

Turning to FIG. 5, a close-up view of the lower portions of legs 272 and 274 is illustrated. Legs 272 and 274 include feet 276 and 278 pivotally coupled thereto, respectively. Each of the feet 276 and 278 is coupled to its corresponding leg 272 or 274 at a pivot point 277. A biasing member 273, such as a spring, is located inside of each leg 272 and 274 and is engageable with the corresponding foot 276 or foot 278. The biasing members 273 force the feet 276 and 278 along the directions of arrows "C" and "D", respectively, to their lowered positions shown in FIG. 4 in which the toes of the feet 276 and 278 are pointing downward. When a child places the feet 276 and 278 into engagement with a support surface and presses downwardly, the feet 276 and 278 pivot relative to legs 272 and 274 along the directions of arrows "E" and "F" to their bent positions 279. When the child moves the toy figure 100 away from the support surface and the feet 276 and 278 out of engagement from the support surface, the biasing members 273 pivot the feet 276 and 278 so their toes are pointing downward once again.

Figure 6:
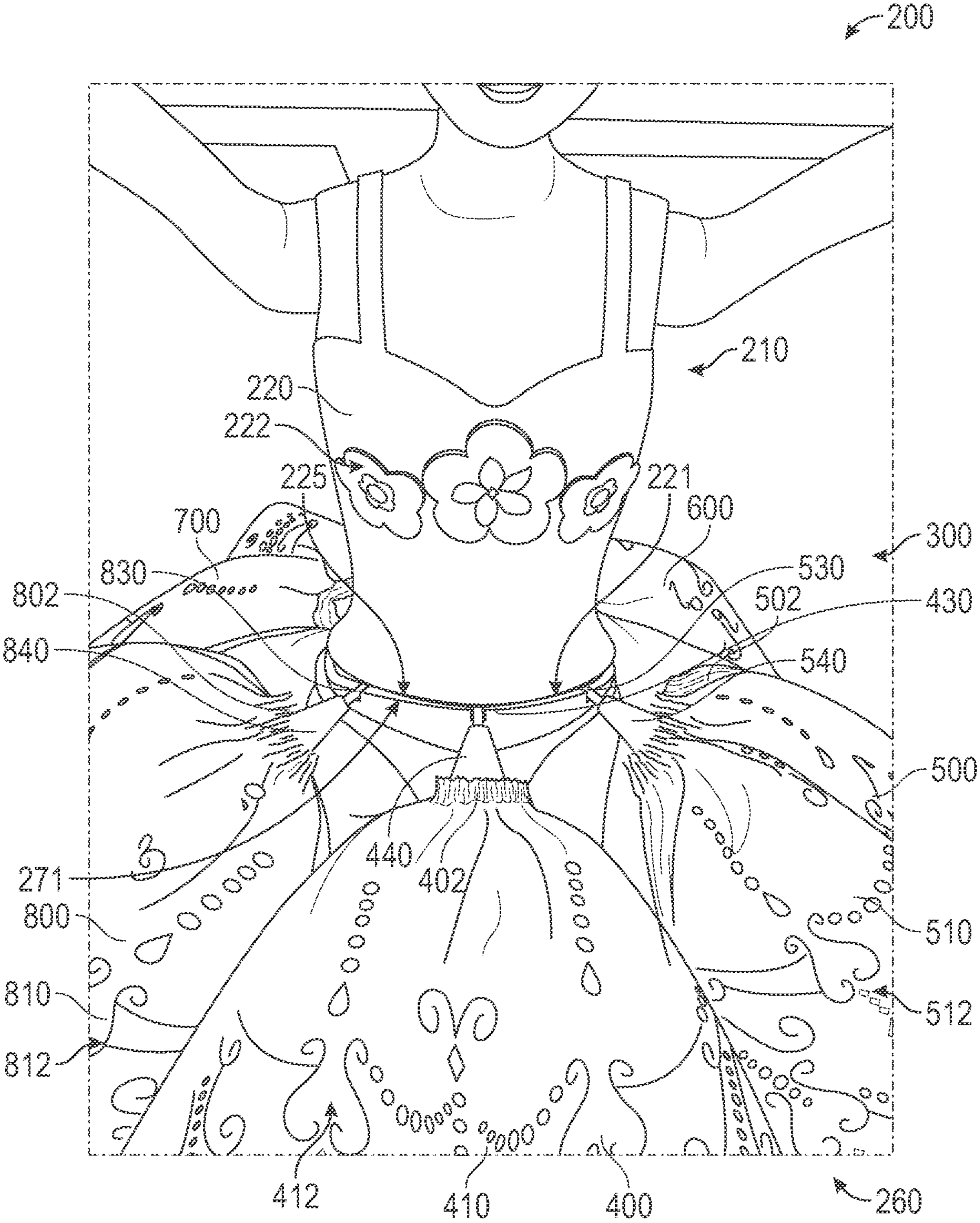
FIG. 6 illustrates a front view of part of the toy figure of FIG. 4.
Figure 7:
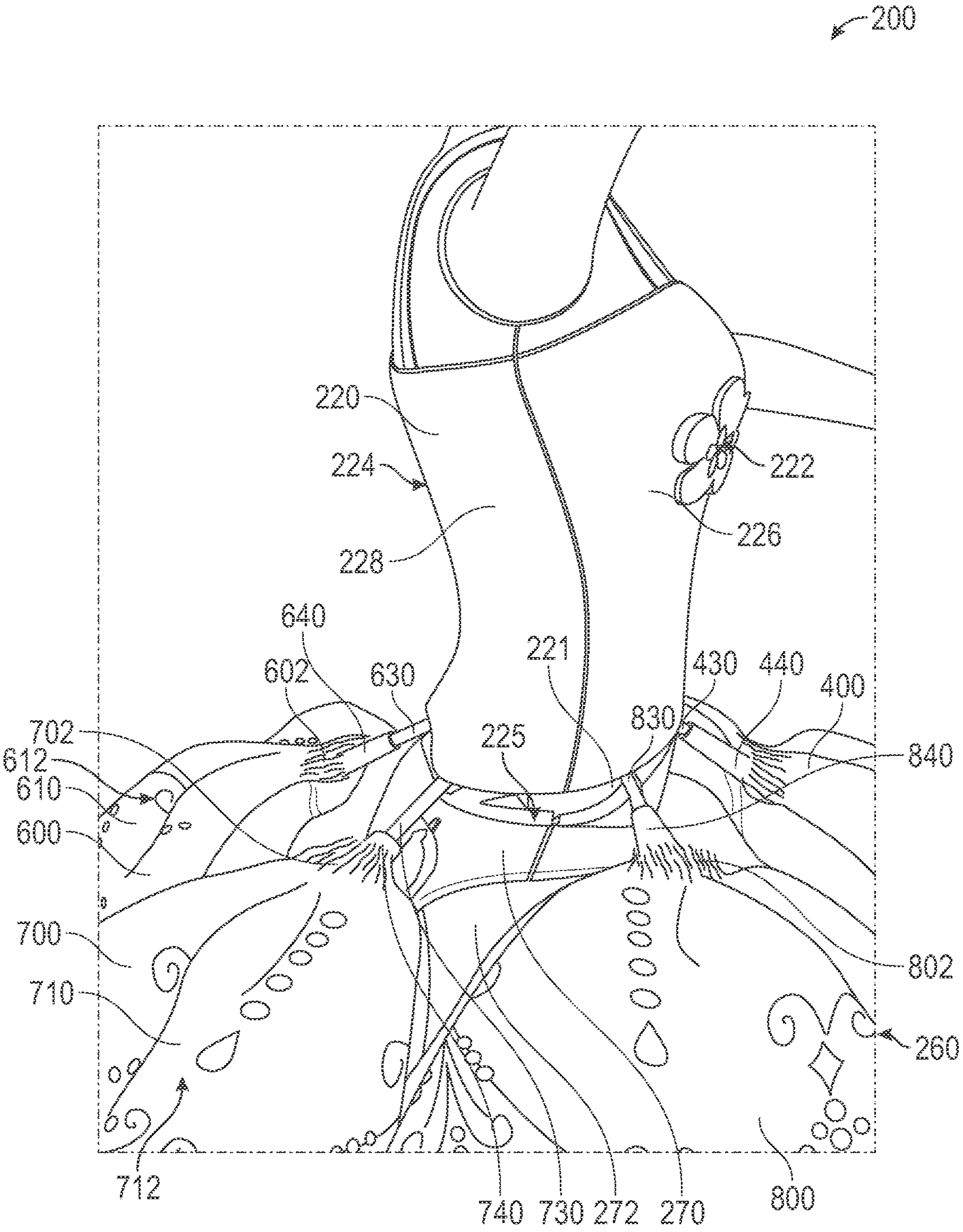
FIG. 7 illustrates a side view of the toy figure of FIG. 6.

Turning to FIGS. 6 and 7, a front view and a side view, respectively, of toy figure 200 are illustrated. The torso 220 of toy figure 200 includes a front side 222 and a rear side 224 opposite to the front side 222. The torso 220 is formed by a front torso portion 226 and a rear torso portion 228 that are engaged with and coupled to each other. The torso 220 also has a lower end 221 that defines the lower edge of the torse 220.

In FIGS. 6 and 7, only a few parts of the lower portion 260 are visible. As shown, the lower portion 260 has a lower body portion 270 with an upper end 271 and to which the legs 272 and 274 are pivotally coupled via one or more connectors (not shown). The upper end 271 of the lower body portion 270 and the lower end 221 of the torso 220 collectively form a gap 225 therebetween.

In this embodiment, toy figure 100 includes a reconfigurable apparel portion 300 that can be reconfigured or transformed into one of several different configurations. Reconfigurable apparel portion 300 includes multiple apparel sections 400, 500, 600, 700, and 800 that are positioned around the perimeter of the toy figure 200. The apparel sections 400, 500, 600, 700, and 800 extend outwardly from the body 202 of the toy figure 200. In one implementation, each of the apparel sections 400, 500, 600, 700, and 800 has a longitudinal axis about which the apparel section rotates, and each of the longitudinal axes are oriented so that they are neither parallel nor perpendicular to longitudinal axes of the upper portion 210 and the lower portion 260. This provides a greater view of the surfaces of the reconfigurable apparel portion.

In this embodiment, the apparel sections 400, 500, 600, 700, and 800 are similar to each other. Accordingly, some of the apparel sections are described in greater detail than other apparel sections, with the understanding that the described features are the same as the corresponding features of the other apparel sections.

Apparel section 400 includes a first material 410 that forms a first side 412 having a first pattern. The first material 410 has a proximal end 402 that is configured to couple the first material 410 to a mount 440 that is located on a rotatable support 430. In this embodiment, after the first material 410 is passed over the mount 440, the proximal end 402 of first material 410 is tightened or restricted (such as by sewing) so that it stays on the body side of the mount 440 and remains coupled thereto. The rotatable support 430 has a longitudinal axis about which the rotatable support 430 rotates.

Each of the other apparel sections 500, 600, 700, and 800 are similar. Apparel section 500 includes a first material 510 that forms a first side 512 having a first pattern. The first material 510 has a proximal end 502 that couples the first material 510 to a mount 540 on a support 530 that is rotatable about its longitudinal axis. Apparel section 600 includes a first material 610 that forms a first side 612 having a first pattern. The first material 610 has a proximal end 602 that couples the first material 610 to a mount 640 on a support 630 that is rotatable about its longitudinal axis. Apparel section 700 includes a first material 710 that forms a first side 712 having a first pattern. The first material 710 has a proximal end 702 that couples the first material 710 to a mount 740 on a support 730 that is rotatable about its longitudinal axis. Apparel section 800 includes a first material 810 that forms a first side 812 having a first pattern. The first material 810 has a proximal end 802 that couples the first material 810 to a mount 840 that is located on a support 830 that is rotatable about its longitudinal axis.

Figure 8:
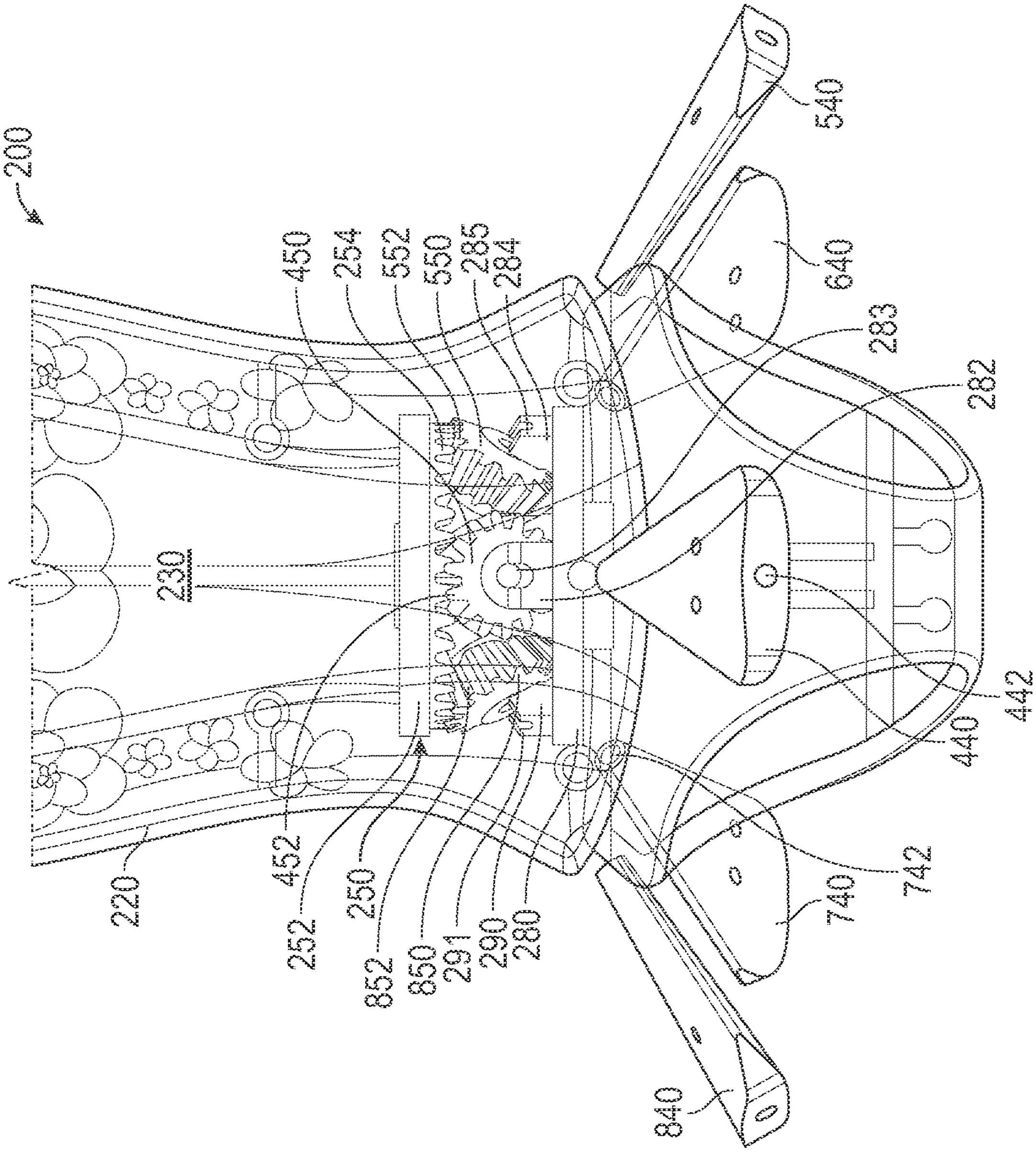
FIG. 8 illustrates a front view of the toy figure of FIG. 4 showing some of the internal components of the toy figure.

Turning to FIG. 8, several components of the toy figure 200 are visible with some components of the toy figure 200 being rendered see-through. The torso 220 defines an interior region 230 between the front torso portion 226 and the rear torso portion 228 (not shown in FIG. 8). The interior region 230 can also be referred to alternatively as a chamber. Located in the interior region 230 is a gear 250 that has a body 252 and teeth 254. In this embodiment, gear 250 is a crown gear with teeth 254 oriented downward.

Located around the perimeter of the toy figure 200 are the mounts 440, 540, 640, 740, and 840 of the various apparel sections. Each of the mounts 440, 540, 640, 740, and 840 has a passageway that extends therethrough from one end to the other end. The passageways are configured to receive supports, and each of the supports is coupled at one of its ends to a corresponding gear. In FIG. 8, only passageway 442 in mount 440 and passageway 742 in mount 740 are illustrated.

In this embodiment, toy figure 200 includes a mounting plate 280 with several mounts or shoulders located thereon. The mounting plate 280 includes the mounts 282, 284, and 290 illustrated in FIG. 8. Mounts 282, 284, and 290 have notches 283, 285, and 291, respectively, formed therein. The rotatable supports (not shown in FIG. 8) of the different apparel sections are located in one of the notches in one of the mounts on mounting plate 280.

The toy figure 200 includes a gear mechanism or a gear system that includes the gears coupled to the rotatable supports of the apparel sections. In FIG. 8, the gear system includes gear 450 with teeth 452, gear 550 with teeth 552, and gear 850 with teeth 852.

Figure 9:
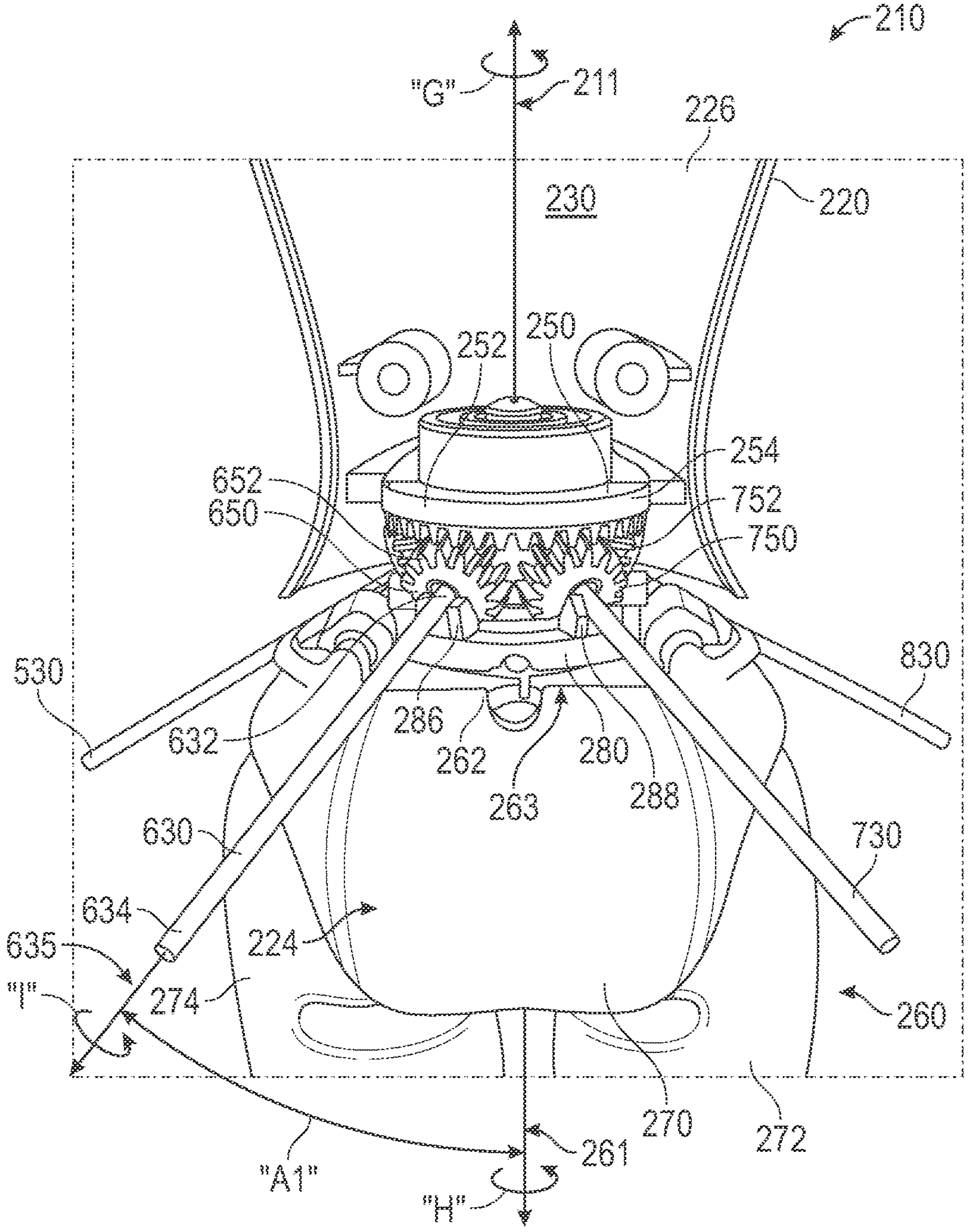
FIG. 9 illustrates a rear view of the toy figure of FIG. 4 showing some of the internal components of the toy figure.
Figure 11:
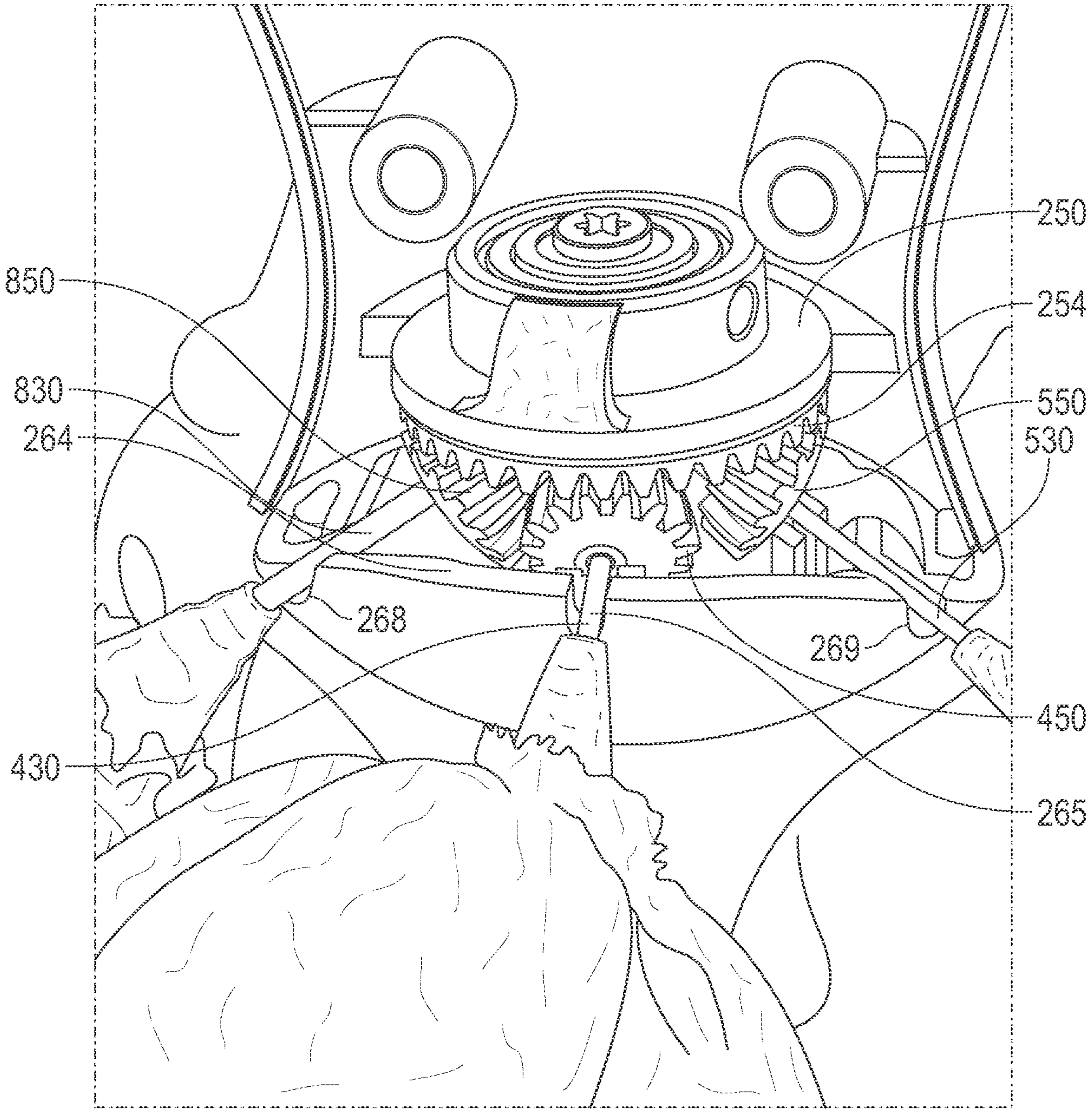
FIG. 11 illustrates a close-up view of some of the internal components of the toy figure of FIG. 9.

Turning to FIGS. 9-11, different views of the various components of the gear system are illustrated. Referring initially to FIG. 9, the upper portion 210 has a longitudinal axis 211 about which the upper portion 210 can rotate relative to the lower portion 260 along the direction of arrow "G" or in the direction opposite to that of arrow "G". Similarly, the lower portion 260 has a longitudinal axis 261 about which the lower portion 260 can rotate relative to the upper portion 210 along the direction of arrow "H" or in the direction opposite to that of arrow "H". The rear torso portion 228 of the torso 220 has been removed from the front torso portion 226, which shows the interior region 230 located therebetween. Gear 250 with body 252 and teeth 254 is located in the interior region 230.

In the rear view shown in FIG. 9, gear 650 with teeth 652 and gear 750 with teeth 752 are illustrated. Each of the gears 450, 550, 650, 750, and 850 is in engagement with gear 250, which can be referred to as a central gear. Thus, when one of the upper portion 210 or the lower portion 260 is rotated relative to the other of the upper portion 210 or the lower portion 260, the central gear 250 drives the apparel section gears 450, 550, 650, 750, and 850 rotate, causing all apparel section gears to rotate simultaneously.

Rotatable support 630 of apparel section 600 includes a proximal end 632 and a distal end 634 located opposite to the proximal end 632. Gear 650 is mounted to the proximal end 632 of rotatable support 630. Rotatable support 630 defines a longitudinal axis 635 about which the support 630 rotates along the direction of arrow "I" or in the direction opposite to that of arrow "I". As shown in FIG. 9, longitudinal axis 635 is oriented at an angle "A1" relative to longitudinal axis 261. In this embodiment, rotatable support 630 and longitudinal axis 635 are oriented so that they are not parallel to and are not perpendicular to either longitudinal axis 211 or longitudinal axis 261. The rotatable supports 530, 730, and 830 of apparel sections 500, 700, and 800, respectively, are illustrated in FIG. 9 and are oriented in the same manner as rotatable support 630 is relative to longitudinal axes 211 and 261.

The lower body portion 270 is shown along with legs 272 and 274. The rear side 224 of the lower body portion 270 includes an upper edge 262 with an elongate notch 263 through which rotatable supports 630 and 730 extend. The rotatable supports 630 and 730 also extend through notches formed in mounts 286 and 288, respectively, formed on mounting plate 280.

Turning to FIGS. 10 and 11, in this embodiment, the gear 250 includes body 255 through which a connector 258 extends to secure the gear 250. A washer 256 may also be provided with the connector 258. Apparel section gears 450, 550, 650, and 850 are illustrated in engagement with the central gear 250. In FIG. 10, rotatable support 530 is located in notch 267 in the upper edge 266 of lower portion 260. In FIG. 11, rotatable support 830 is located in notch 268 in the upper edge 264, rotatable support 430 is located in notch 265, and rotatable support 530 is located in notch 269. Each of those notches may be rounded or curved to facilitate rotating of the corresponding support.

Turning to FIGS. 12-30, different embodiments of toy figures according to the present disclosure are illustrated. As described in greater detail below, the gear system of the toy figure is positioned such that the apparel sections and their beveled gears are connected to an upper portion of the toy figure body. The gear system includes a crown gear that is engaged with the beveled gears and oriented with its teeth pointed downward. In these embodiments, the crown gear is connected to a lower portion of the toy figure. Thus, when a user rotates the upper portion of the toy figure relative to the lower portion of the toy figure, the apparel sections, and their respective longitudinal axes, rotate and also orbit or revolve while the beveled gears travel along the stationary crown gear. When a user rotates the lower portion of the toy figure relative to the upper portion of the toy figure, the crown gear moves, which causes the apparel sections to rotate in place about their longitudinal axes.

Referring initially to FIGS. 12-16, several positions of a toy figure being reconfigured are illustrated. In this embodiment, a toy figure 1000 includes an upper portion 1010 and a lower portion 1020, each of which is rotatable relative to the other. The toy figure 1000 also includes a reconfigurable apparel portion 1030 coupled to the body of the toy figure 1000. The reconfigurable apparel portion 1030 is transformable between different configurations.

Figure 12:
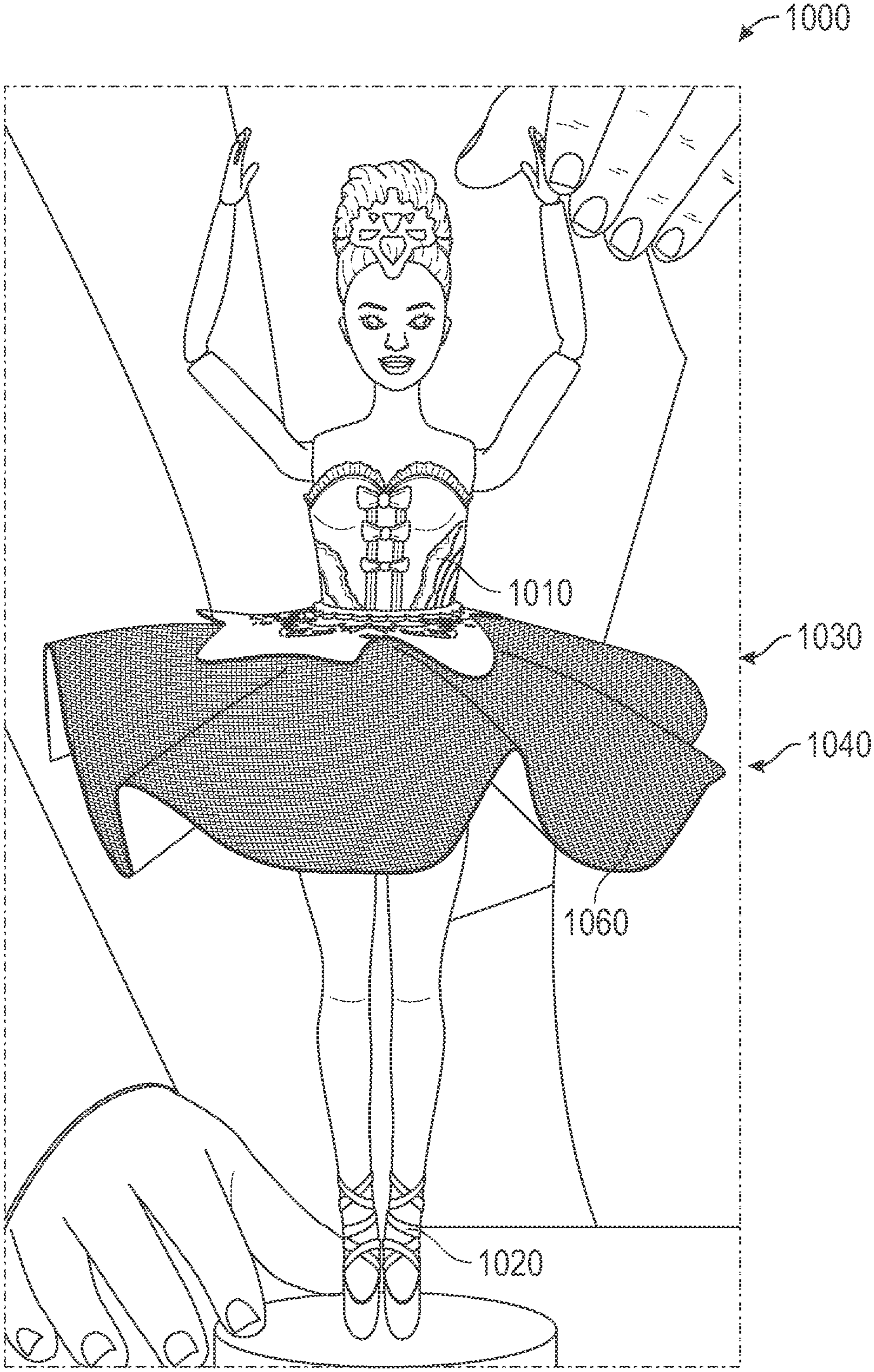
FIG. 12 illustrates a front view of another embodiment a toy figure having a reconfigurable apparel portion in a first configuration according to the present invention.

In FIG. 12, toy figure 1000 is shown with its reconfigurable apparel portion 1030 being disposed in first configuration 1040 in which each apparel section has a first material 1060 oriented upward. This first configuration 1040 corresponds to both the upper portion 1010 and the lower portion 1020 being oriented in forward facing positions.

Figure 13:
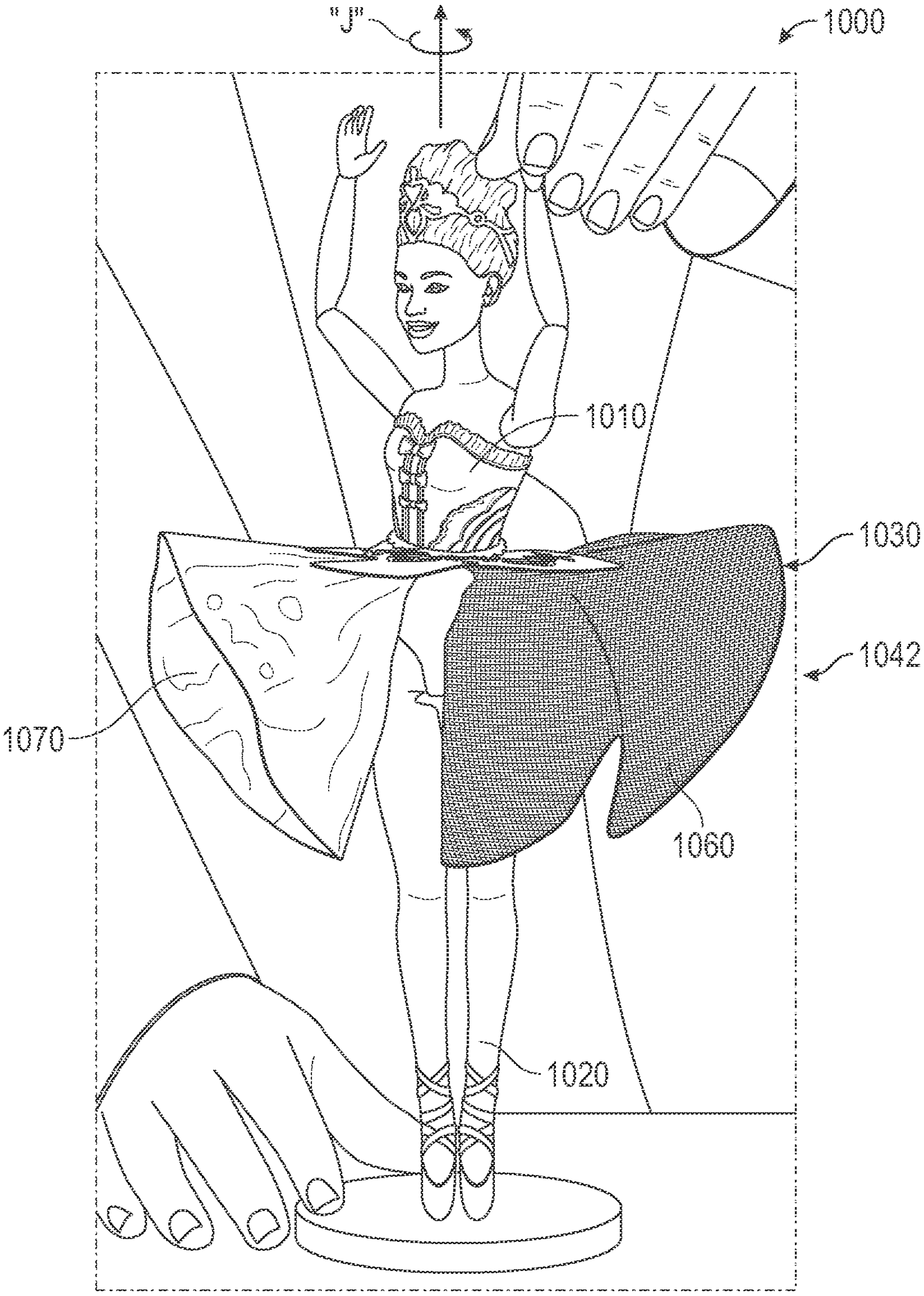
FIG. 13 illustrates a front view of the toy figure of FIG. 12 with its reconfigurable apparel portion in an intermediate configuration.

In FIG. 13, the lower portion 1020 of the toy figure 1000 is held in its position while a user rotates the upper portion 1010 of the toy figure 1000 relative to the lower portion 1020 along the direction of arrow "J". FIG. 13 shows the reconfigurable apparel portion 1030 in an intermediate configuration 1042 in which different sides or materials 1060 and 1070 are visible as the apparel sections are not oriented so that only one of the materials 1060 or 1070 is facing upward.

Figure 14:
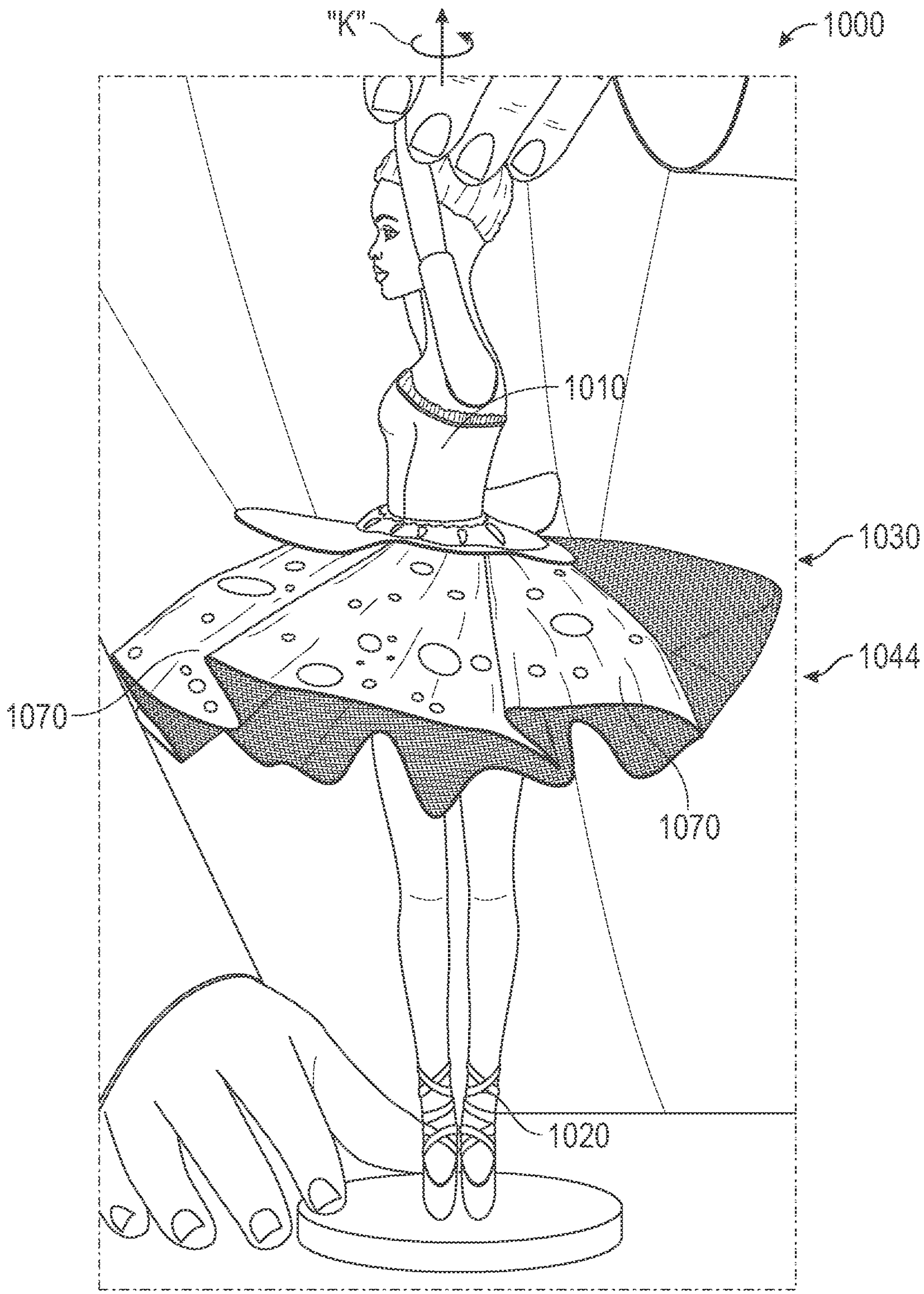
FIG. 14 illustrates a front view of the toy figure of FIG. 12 with its reconfigurable apparel portion in another intermediate configuration.

In FIG. 14, the user continues to rotate the upper portion 1010 relative to the lower portion 1020, which in this drawing is along the direction of arrow "K". FIG. 14 shows the reconfigurable apparel portion 1030 in another intermediate configuration 1044 in which material 1070 of each apparel section are facing upward.

Figure 15:
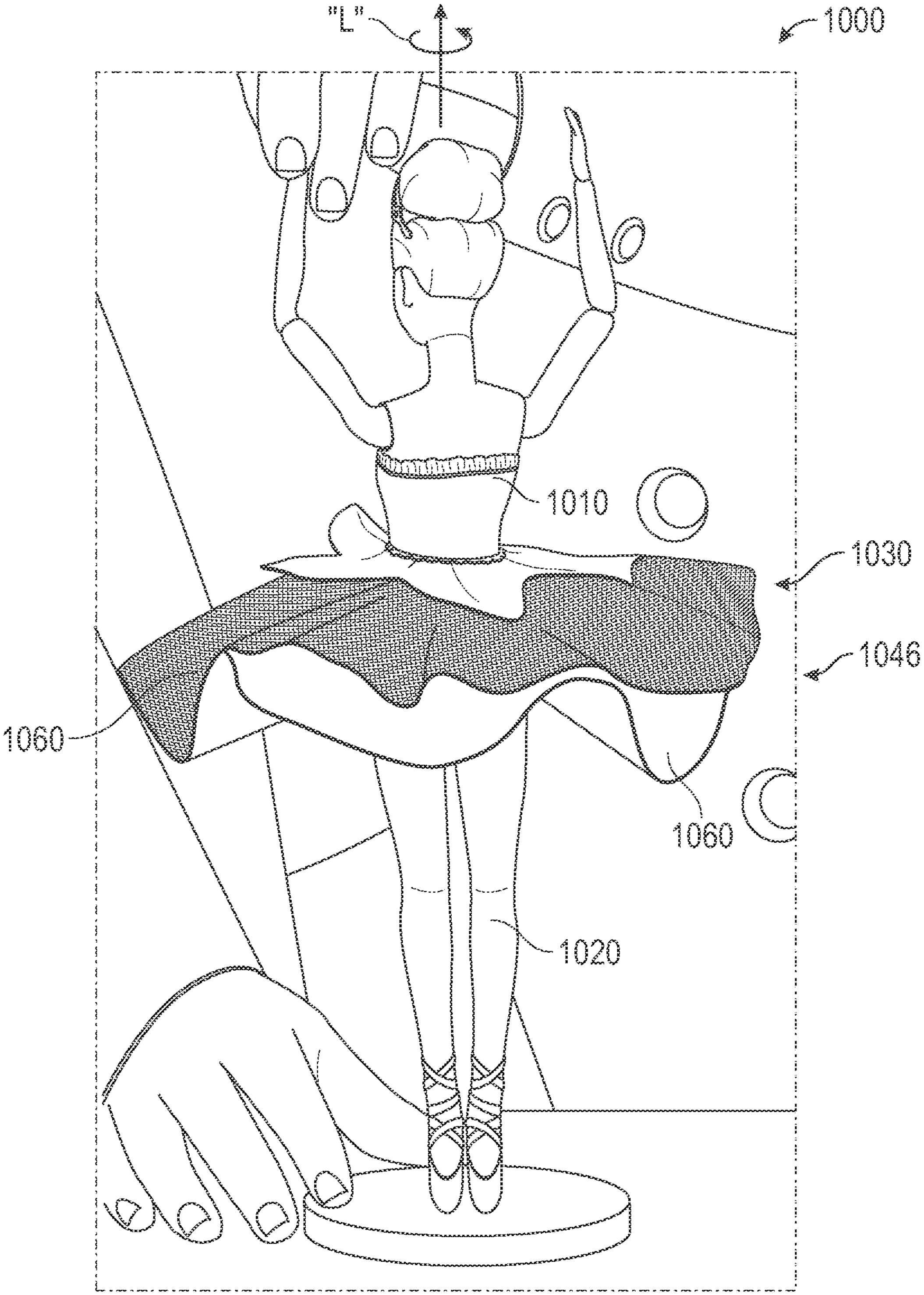
FIG. 15 illustrates a front view of the toy figure of FIG. 12 with its reconfigurable apparel portion in another intermediate configuration.

In FIG. 15, the user continues to rotate the upper portion 1010 relative to the lower portion 1020, which in this drawing is along the direction of arrow "L". FIG. 15 shows the reconfigurable apparel portion 1030 in another intermediate configuration 1046 in which the material 1060 of each apparel section are facing upward.

Figure 16:
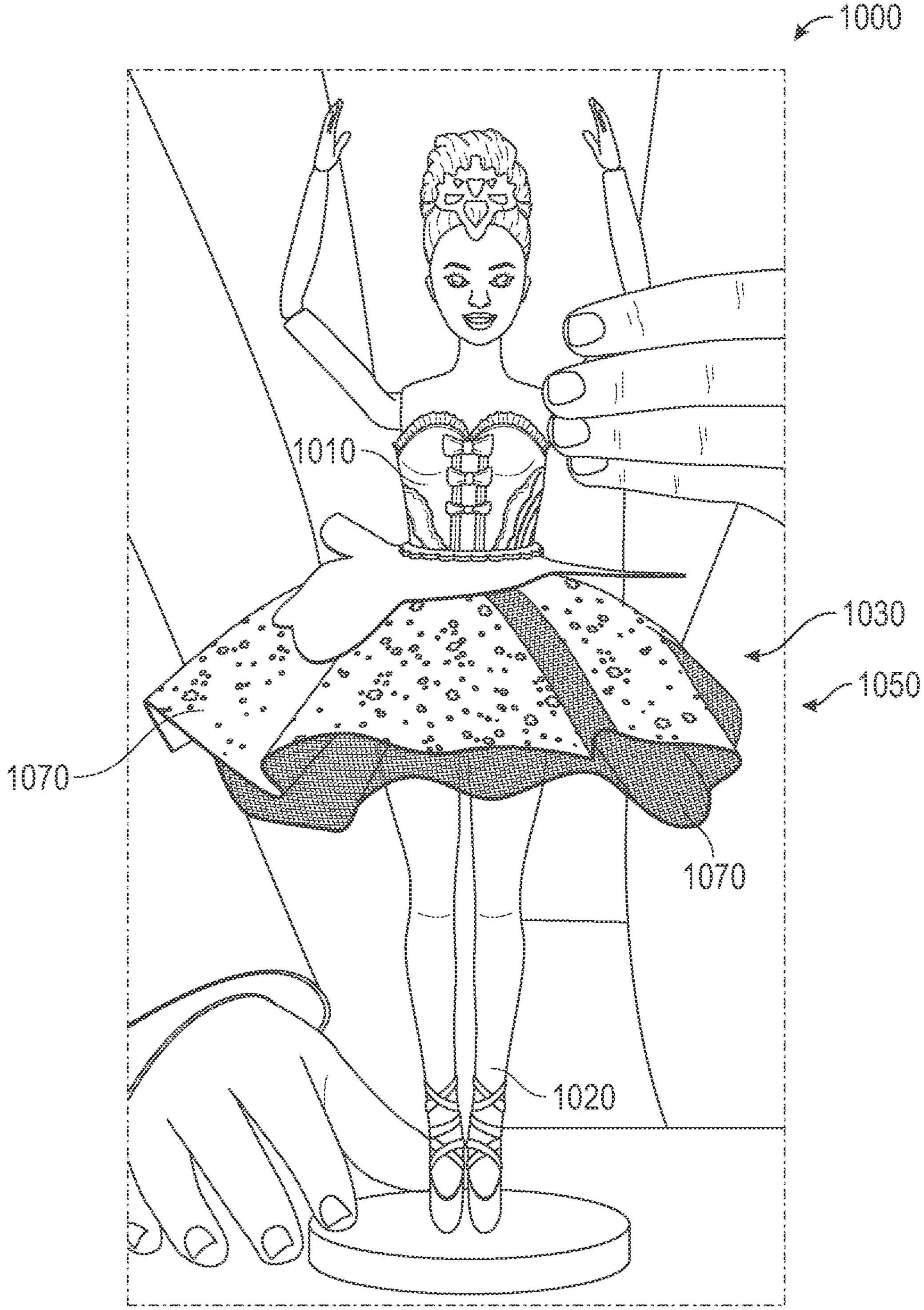
FIG. 16 illustrates a front view of the toy figure of FIG. 12 with its reconfigurable apparel portion in a second configuration.

In FIG. 16, the user has rotated the upper portion 1010 relative to the lower portion 1020 through a full rotation of upper portion 1010 while holding the lower portion 1020 still. As shown, toy figure 1000 is in a second configuration 1050 in which material 1070 of each apparel are facing upward. Thus, while both the upper portion 1010 and the lower portion 1020 are facing forwardly in FIG. 16 and material 1070 is oriented upwardly, referring back to FIG. 12, both the upper portion 1010 and the lower portion 1020 are facing forwardly and material 1060 is oriented upwardly. While upper portion 1010 is rotated a full revolution about its longitudinal axis, a different material (material 1070 vs. material 1060) is facing upwardly, thereby giving the toy figure 1000 a different overall appearance.

Figure 17:
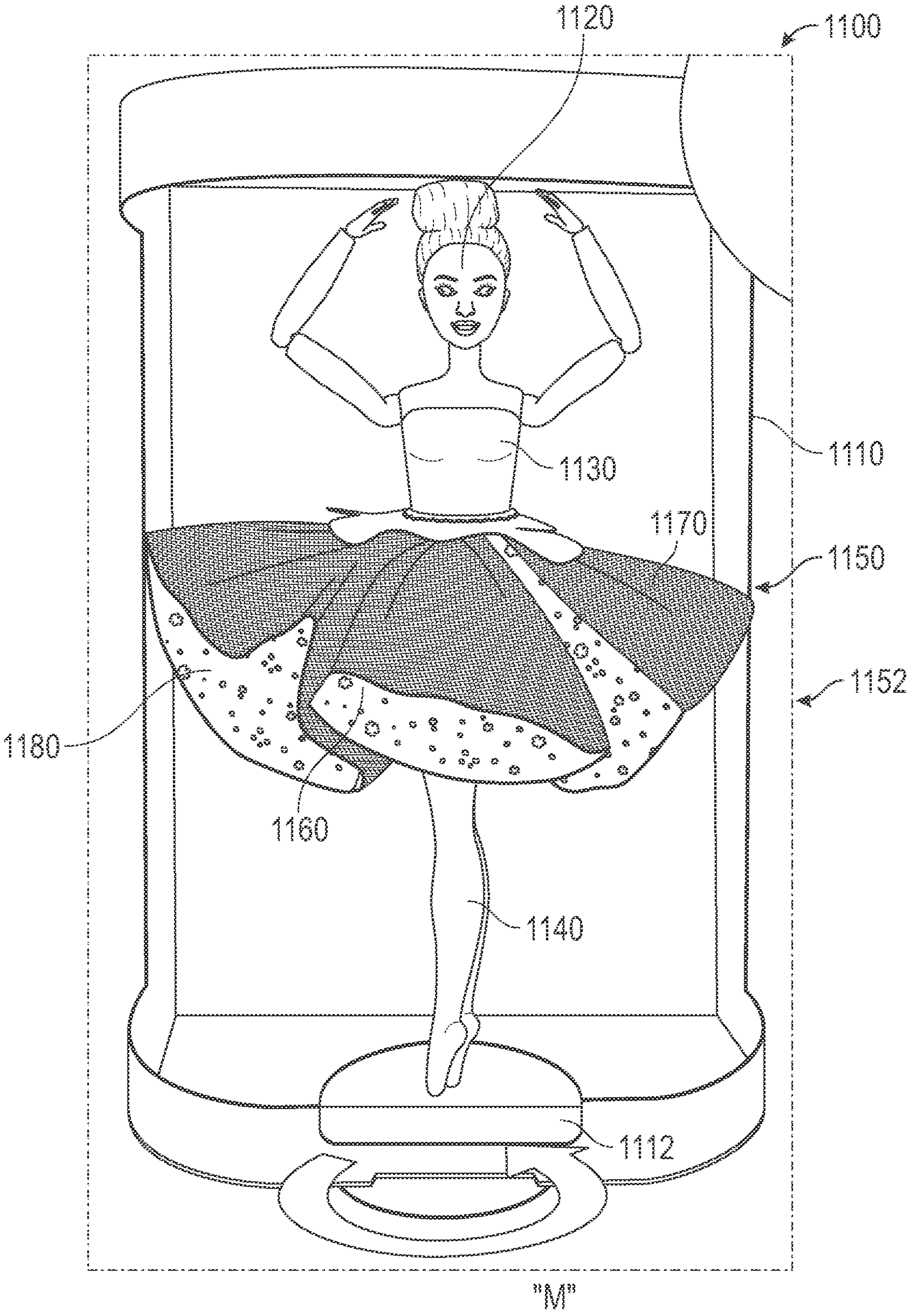
FIG. 17 illustrates a front view of another embodiment of a toy figure in packaging according to the present disclosure, with the toy figure being in a first configuration.
Figure 18:
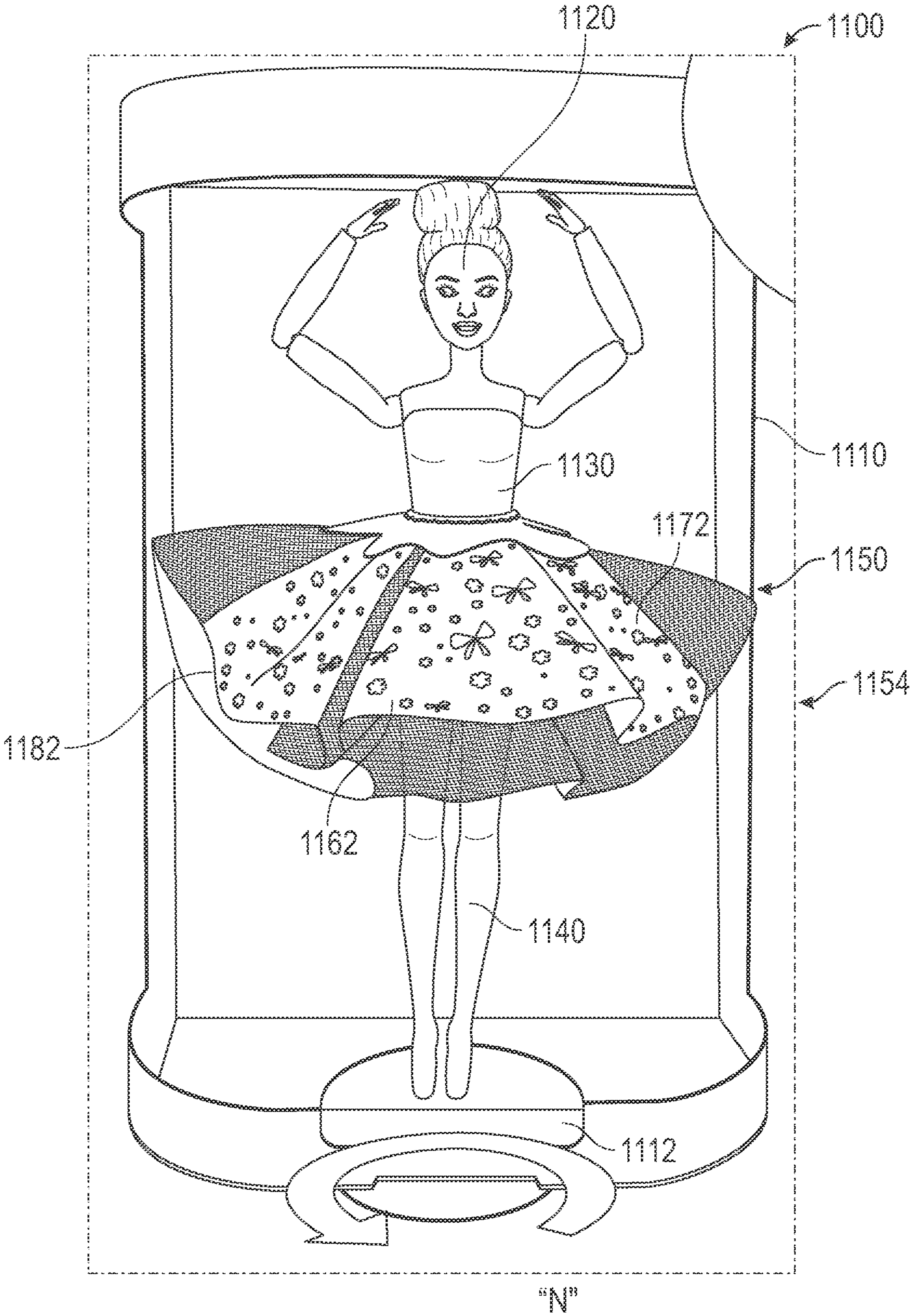
FIG. 18 illustrates a front view of the toy figure of FIG. 17 in a second configuration.
Figure 19:
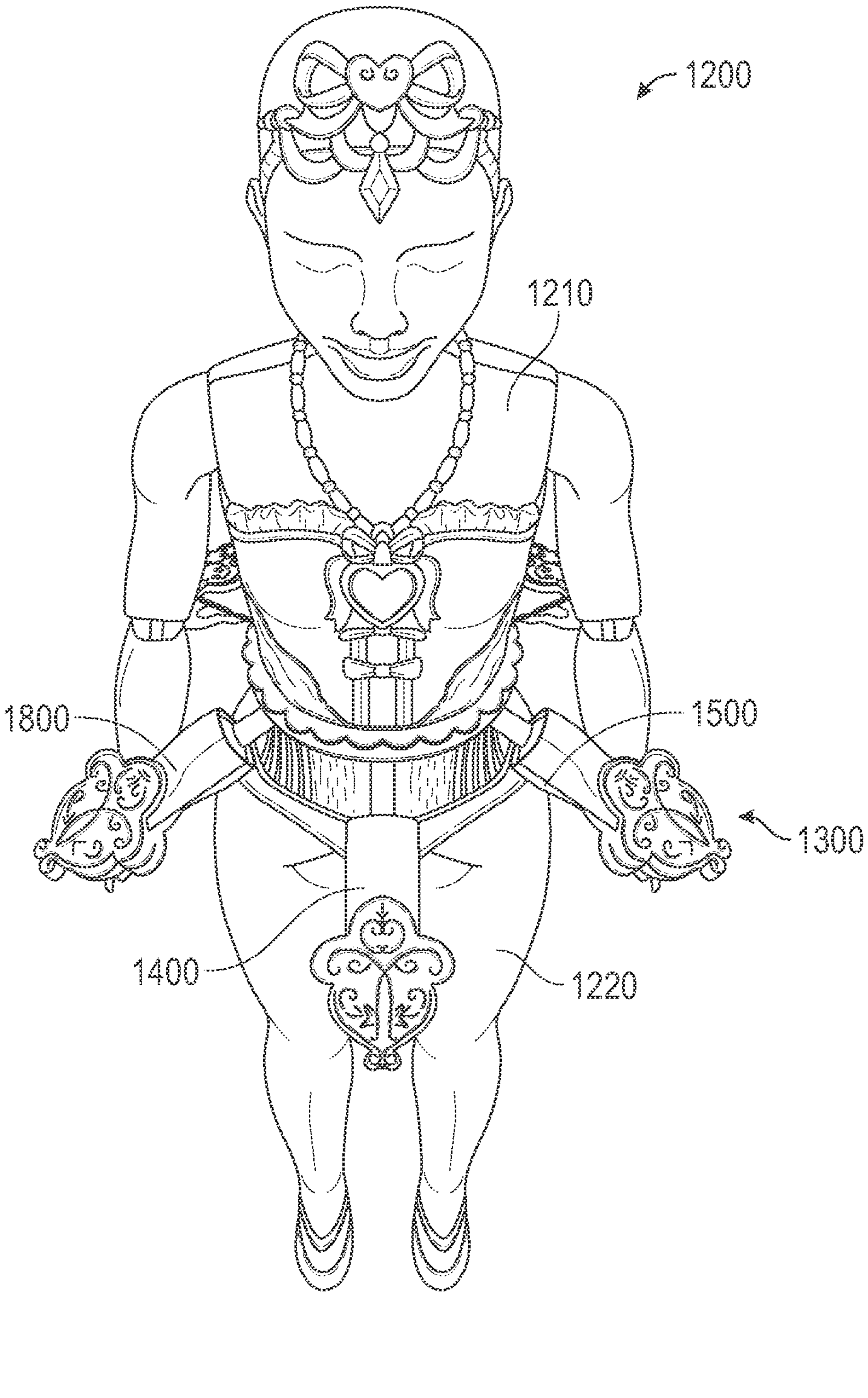
FIG. 19 illustrates a top perspective view of another embodiment of a toy figure according to the present disclosure.

Turning to FIGS. 17-18, a product 1100 includes a package 1110 with a try-me feature including a rotatable disc 1112 that can be engaged by a user. Inside of the package 1110 is a toy figure 1120. The toy figure 1120 is mounted in the package 1110 so that its upper portion 1130 is held in place and its lower portion 1140 is coupled to the rotatable disc 1112. Thus, when a user rotates disc 1112, the lower portion 1140 rotates therewith. The disc 1112 can be rotated alternately along the direction of arrow "M" in FIG. 17 and along the direction of arrow "N" in FIG. 18.

The toy figure 1120 has a reconfigurable apparel portion 1150 that includes several apparel sections. The reconfigurable apparel portion 1150 can be reconfigured or transforms so that different materials of the apparel sections are facing upwardly, thereby providing different visual appearances for the toy figure 1120 while the toy figure 1120 remains in the package 1110. When the lower portion 1140 rotates, the apparel sections of the reconfigurable apparel portion 1150 are rotated as well. In FIG. 17, the reconfigurable apparel portion 1150 is shown in a first configuration 1152 in which materials 1160, 1170, and 1180 are facing upwardly. In FIG. 18, the reconfigurable apparel portion 1150 is shown in a second configuration 1154 in which materials 1162, 1172, and 1182 are facing upwardly. Materials 1162, 1172, and 1182 are the same as each other in terms of colors and/or patterns, and are different from materials 1160, 1170, and 1180, which are the same as each other in terms of colors and/or patterns.

The try-me package 1110 allows the apparel sections to rotate in place when the lower portion 1140 of the toy figure 1120 is twisted. By enabling the apparel sections to rotate in place in the try-me package 1110, the need for additional packaging space to allow the apparel sections to revolve or orbit around the toy figure 1120 is eliminated.

Referring to FIGS. 19-30, another embodiment of a toy figure according to the aspects of the present disclosure is illustrated. In this embodiment, toy figure 1200 has an upper portion 1210 and lower portion 1220. Similar to the previously described toy figures, upper portion 1210 and lower portion 1220 can be rotated relative to each other. Toy FIG. 1200 also includes a reconfigurable apparel portion 1300. To simplify the description of toy figure 1200, the materials of the apparel sections of the reconfigurable apparel portion 1300 have been removed from FIGS. 19-30. As a result, rotatable supports 1400, 1500, and 1800 of reconfigurable apparel portion 1300 are shown. It is to be understood that there are two additional rotatable supports located on the back side of toy figure 1200, and therefore are not visible in FIG. 19.

Figure 20:
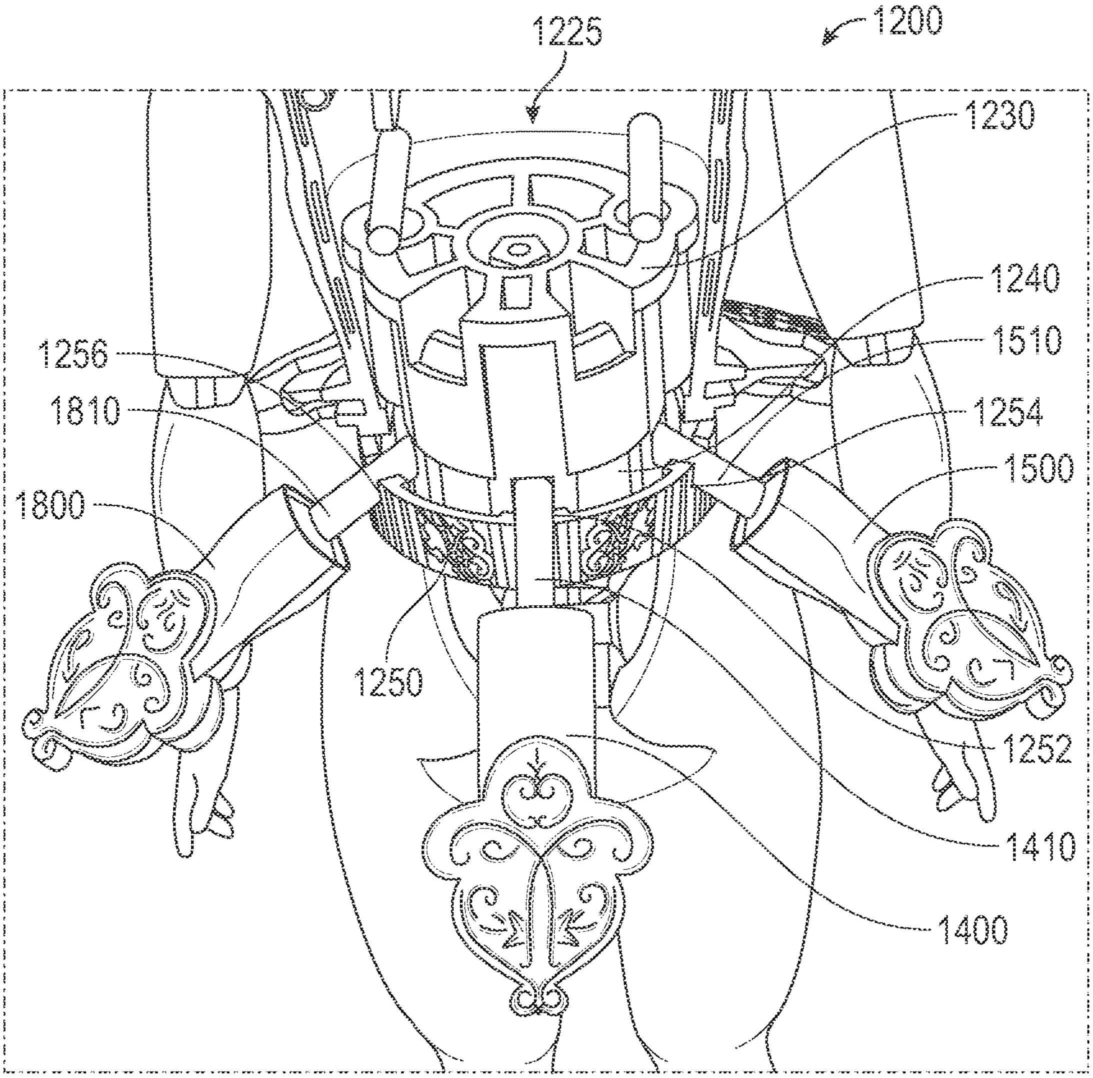
FIG. 20 illustrates a close-up top perspective view of part of the toy figure of FIG. 19 with some components removed.

Turning to FIG. 20, a front torso portion of toy figure 1200 has been removed, thereby revealing some of the internal components of toy figure 1200. Toy FIG. 1200 has a gear system 1225 that includes an upper gear box 1230 and a lower gear box 1240 that is coupled to the upper gear box 1230. Located around the lower gear box 1240 is a housing portion 1250, which in this embodiment resembles a belt for toy figure 1200. Housing portion 1250 has several notches 1252, 1254, and 1256 formed in its upper end or surface.

In this embodiment, rotatable support 1400 includes a shaft or spoke 1410 that has a longitudinal axis about which the shaft 1410 rotates. Shaft 1410 is located in notch 1252 and is rotatable therein. Similarly, rotatable support 1500 includes a shaft or spoke 1510 that has a longitudinal axis about which the shaft 1510 rotates. Shaft 1510 is located in notch 1254. Also, rotatable support 1800 includes a shaft or spoke 1810 that has a longitudinal axis about which the shaft 1810 rotates. Shaft 1810 is located in notch 1256.

Figure 21:
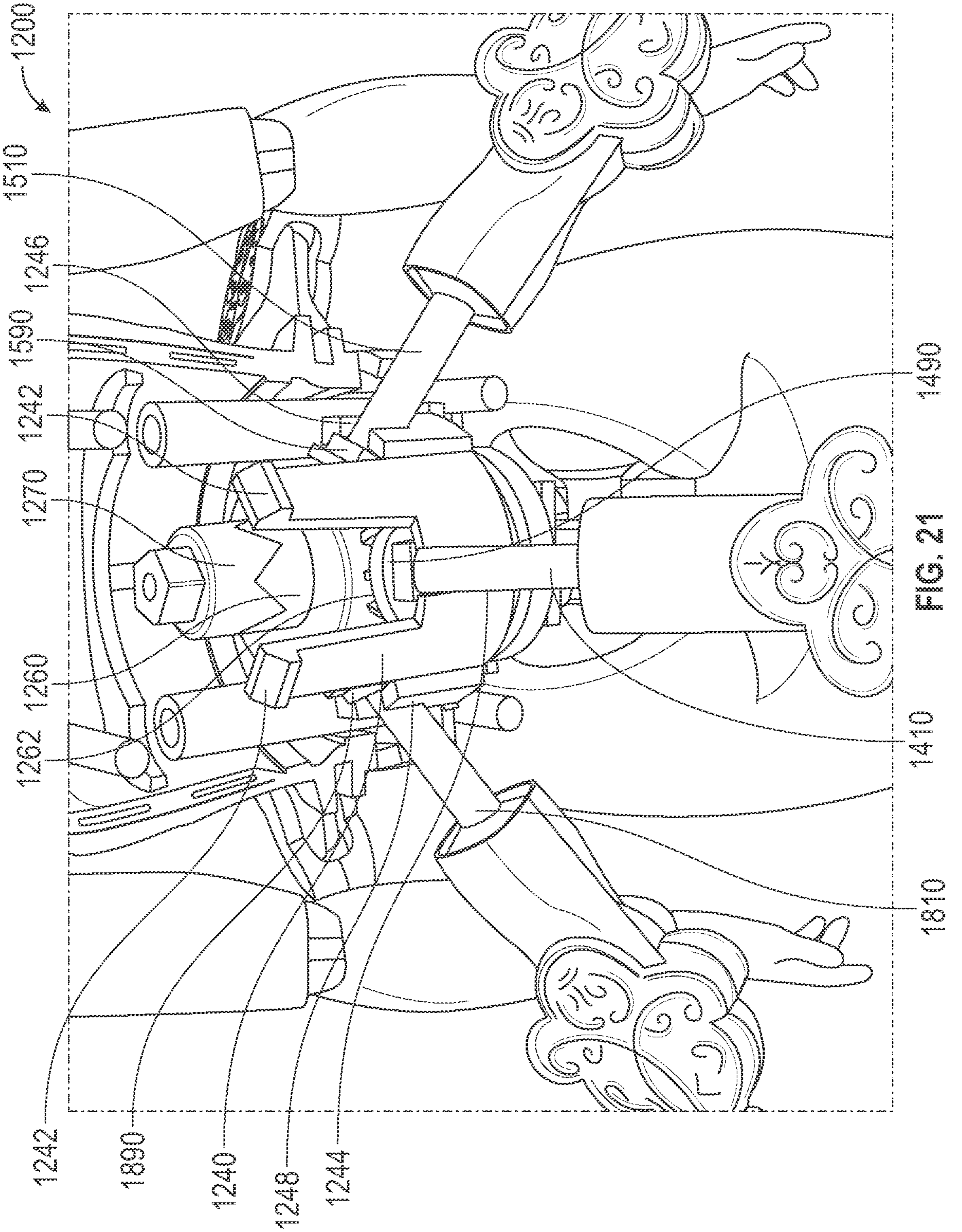
FIG. 21 illustrates a close-up top perspective view of several of the components of the toy figure of FIG. 20.

Turning to FIG. 21, the upper gear box 1230 has been removed, thereby facilitating the description of additional components of the gear system 1225 and toy figure 1200. Lower gear box 1240 includes spaced apart catches 1242 and also includes spaced apart slots provided around a perimeter of the lower gear box 1240. In FIG. 21, lower gear box 1240 includes a notch or slot 1244 in which shaft 1410 is located. Gear 1490 is coupled to a proximal end of shaft 1410. Lower gear box 1240 also includes a notch or slot 1246 in which shaft 1510 is located. Gear 1590 is coupled to a proximal end of shaft 1510. In addition, lower gear box 1240 includes a notch or slot 1248 in which shaft 1810 is located. Gear 1890 is coupled to a proximal end of shaft 1810.

Gear system 1225 of toy figure 1200 includes a gear 1260 with teeth 1262. In this embodiment, gear 1260 is a crown gear with teeth 1262 oriented downward. Engageable with gear 1260 is a clutch gear 1270, which is described in greater detail below. Gear 1260 is engaged with multiple apparel section gears (such as gears 1490, 1590, and 1890) positioned around the perimeter of the toy figure 1200. In this embodiment, the apparel section gears are beveled gears.

Gear system 1225 is positioned such that the beveled gears of the apparel sections are connected to the upper portion 1210 of the toy figure 1200 and the crown gear 1260 is connected to the lower portion 1220 of the toy figure 1200. When a user rotates the upper portion 1210 relative to the lower portion 1220, the apparel sections rotate and also orbit or revolve while their beveled gears travel along the stationary crown gear 1260. When a user rotates the lower portion 1220 relative to the upper portion 1210, the crown gear 1260 moves, which causes the apparel sections to rotate in place about their longitudinal axes.

Figure 22:
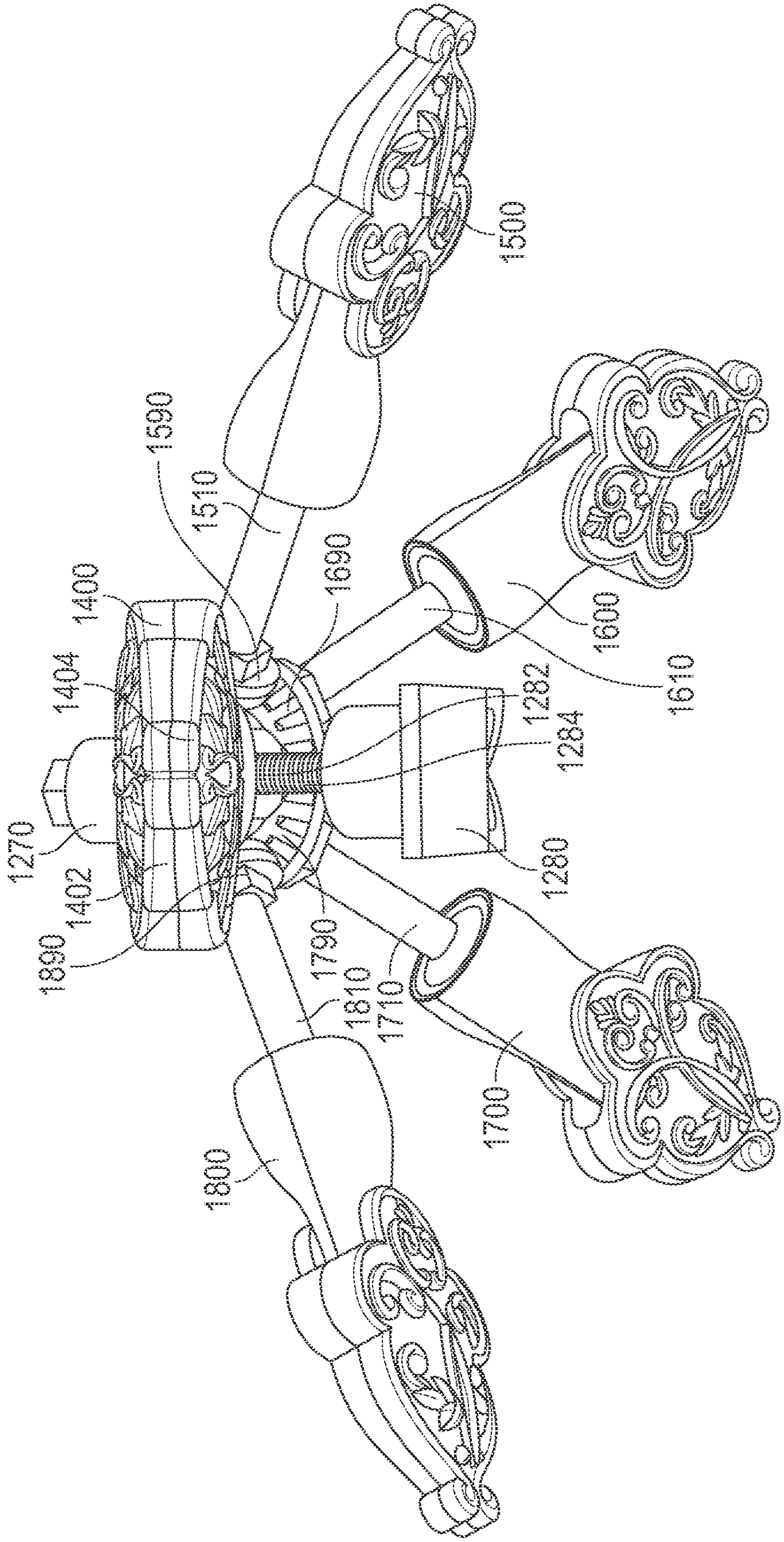
FIG. 22 illustrates a bottom perspective view of a mechanism for a reconfigurable apparel section of the toy figure of FIG. 19.

Turning to FIG. 22, a perspective view of some of the components of the gear system 1225 and some of the components of the reconfigurable apparel portion 1300 of toy figure 1200 are illustrated. Each of the supports 1400, 1500, 1600, 1700, and 1800 is similar to each other. Therefore, any descriptions of components of one of the supports 1400, 1500, 1600, 1700, and 1800 apply to the other supports.

Support 1400 includes a first cover 1402 and a second cover 1404. The first cover 1402 and the second cover 1404 are coupled to and located adjacent to a distal end of the shaft 1410. Support 1500 includes gear 1590 coupled to the proximal end of the shaft 1510. Similarly, each of the supports 1600, 1700, and 1800 includes a gear 1690, 1790, and 1890, respectively, coupled to the proximal end of its corresponding shaft 1610, 1710, and 1810.

The gear system 1225 also includes a base 1280 and an axle 1282 extending upward from the base 1280. The base 1280 is connected to the lower portion 1220 of the toy figure 1200 and is operatively coupled to the crown gear 1260. A spring 1284 is mounted on the axle 1282. The spring 1284 biases gear 1260 upwardly into engagement with the clutch gear 1270. When the clutch gear 1270 and gear 1260 rotate relative to each other, the spring 1284 absorbs vertical movement of gear 1260, such as when the clutch is activated. The clutch prevents damage to the toy figure and in particular to the reconfigurable apparel portion if a child is rotating one of the upper portion 1210 or the lower portion 1220 and also holding onto part of the reconfigurable apparel portion 1300 and not allowing the reconfigurable apparel portion 1300 to move.

Figure 23:
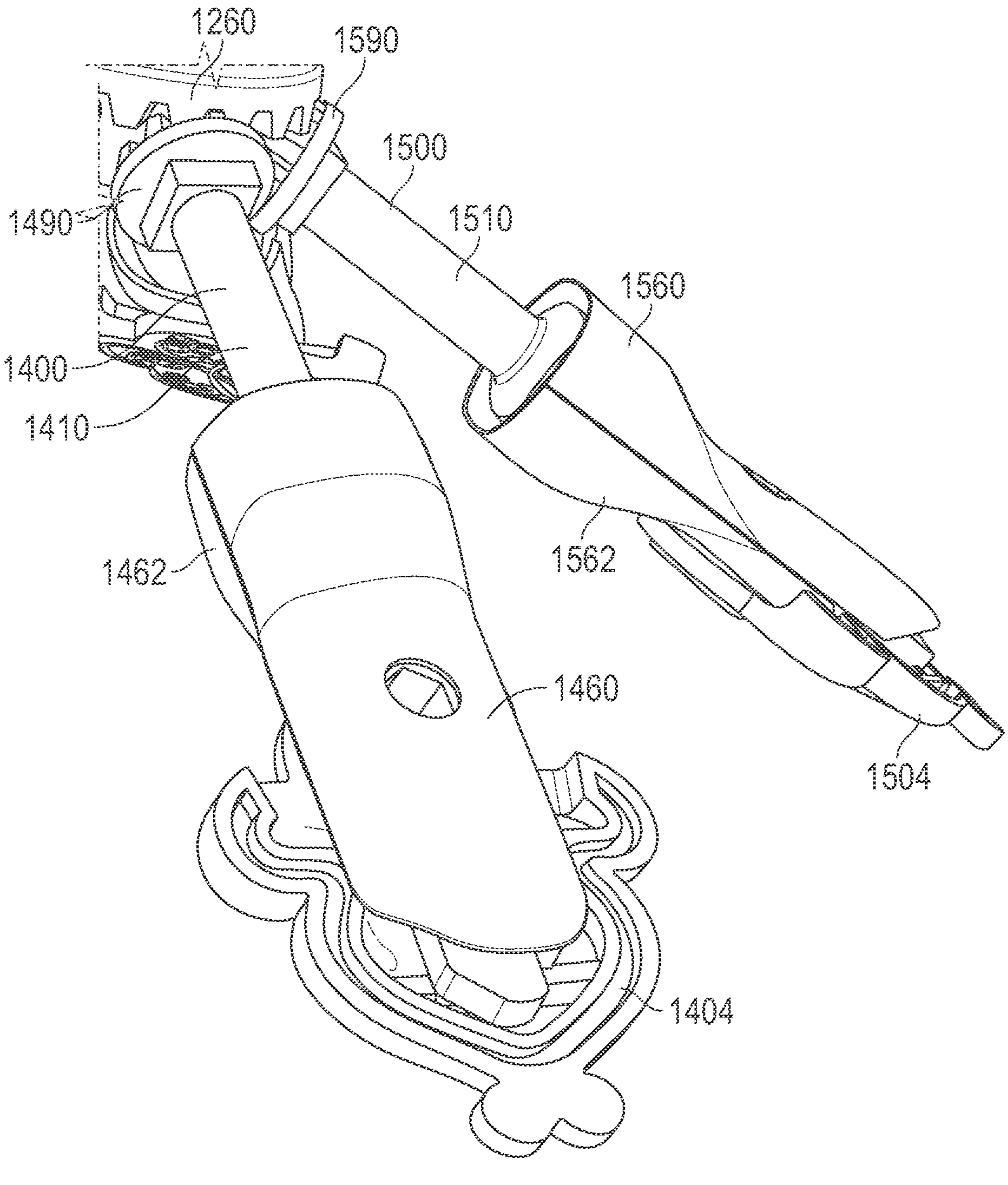
FIG. 23 illustrates a close-up perspective view of some of the components of the mechanism of FIG. 22.

Turning to FIG. 23, a close-up view of some of the components shown in FIG. 22 is illustrated. The first cover for each of support 1400 and support 1500 has been removed. Support 1400 includes two housing portions 1460 and 1462, with second cover 1404 being located outside of housing portion 1462. The gear 1490 coupled to the proximal end of shaft 1410, and in engagement with the teeth of gear 1260 is also shown. Similarly, support 1500 has two housing portions 1560 and 1562, with second cover 1504 being outside of housing portion 1562. The gear 1590 coupled to the proximal end of shaft 1510 and in engagement with gear 1260 is also shown.

Figure 24:
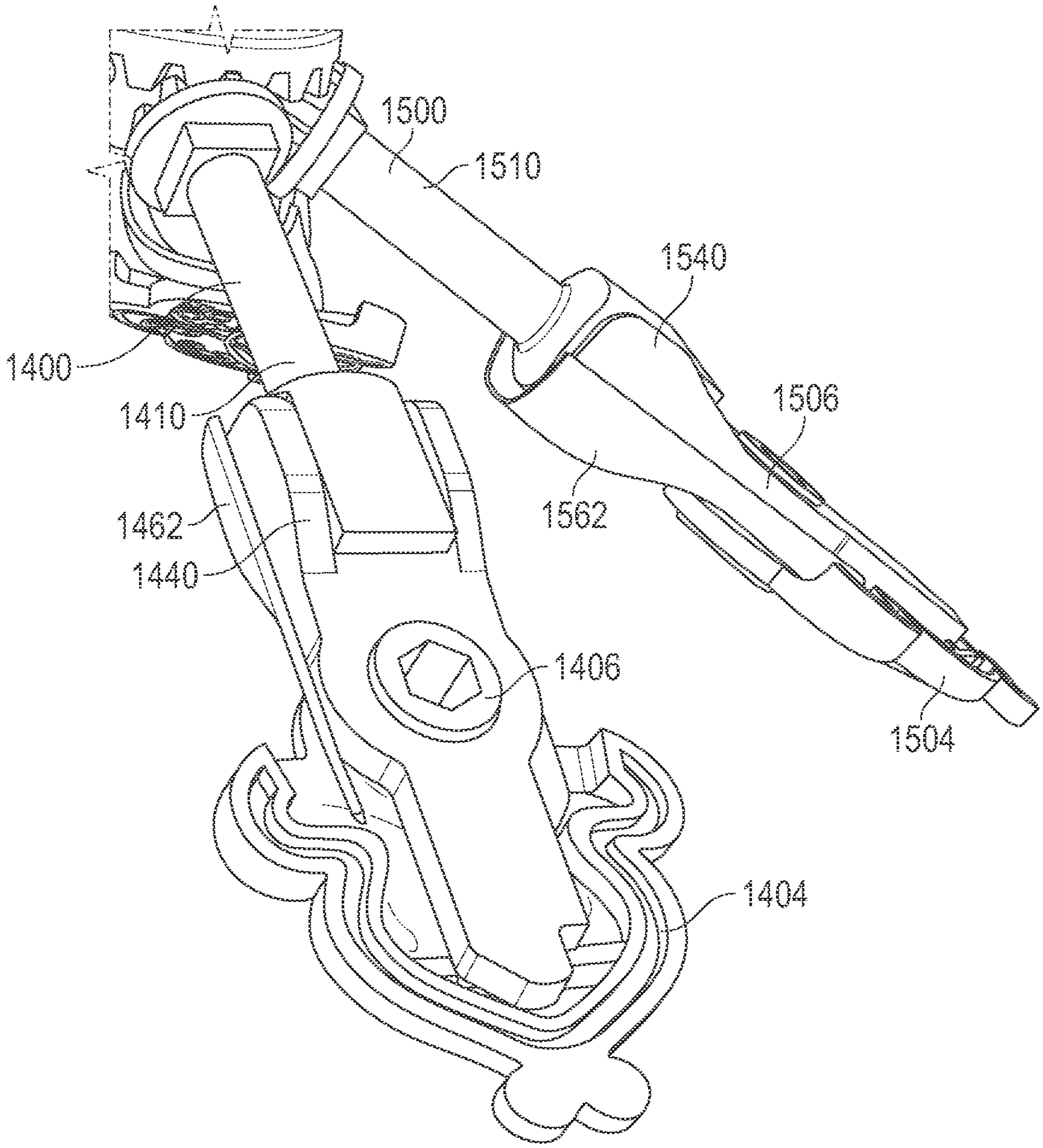
FIG. 24 illustrates a close-up perspective view of some of the components of the mechanism of FIG. 22.

In FIG. 24, housing portions 1460 and 1560 are removed relative to FIG. 23. Shaft 1410 of support 1400 is engaged with a coupler 1440 that has a hole that receives post 1406 on second cover 1404. Housing portion 1462 is located on one side of the coupler 1440. Similarly, shaft 1510 of support 1500 is engaged with a coupler 1540 that has a hole that receives post 1506 on second cover 1504. Housing portion 1562 is located on one side of the coupler 1540.

Figure 25:
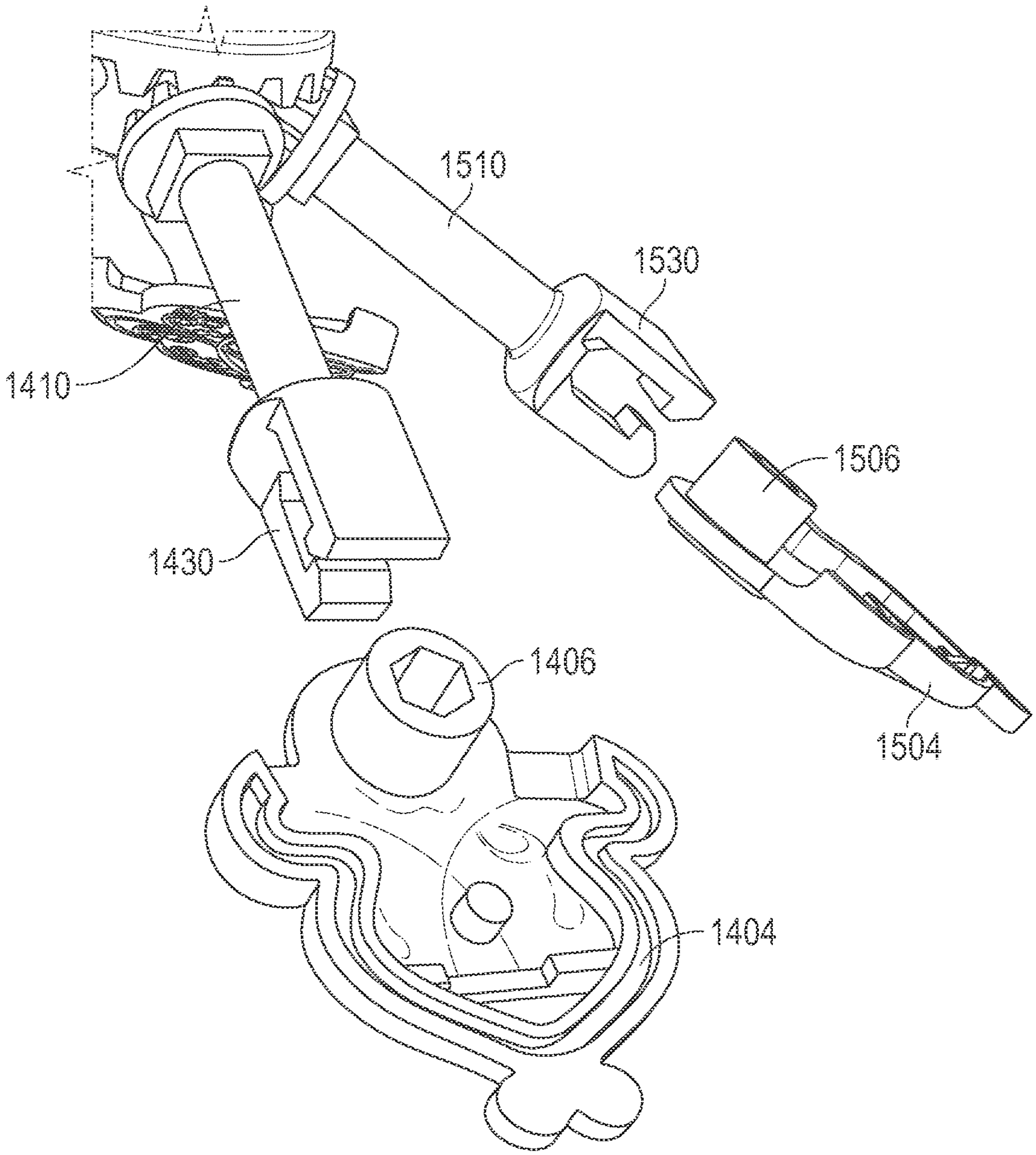
FIG. 25 illustrates a close-up perspective view of some of the components of the mechanism of FIG. 22.

In FIG. 25, housing portions 1462 and 1562 and couplers 1440 and 1540 have been removed relative to the view shown in FIG. 24. The distal end of shaft 1410 includes connector 1430 and the distal end of shaft 1510 includes connector 1530. The posts 1406 and 1506 of the second covers 1404 and 1504, respectively, are illustrated.

Figure 26:
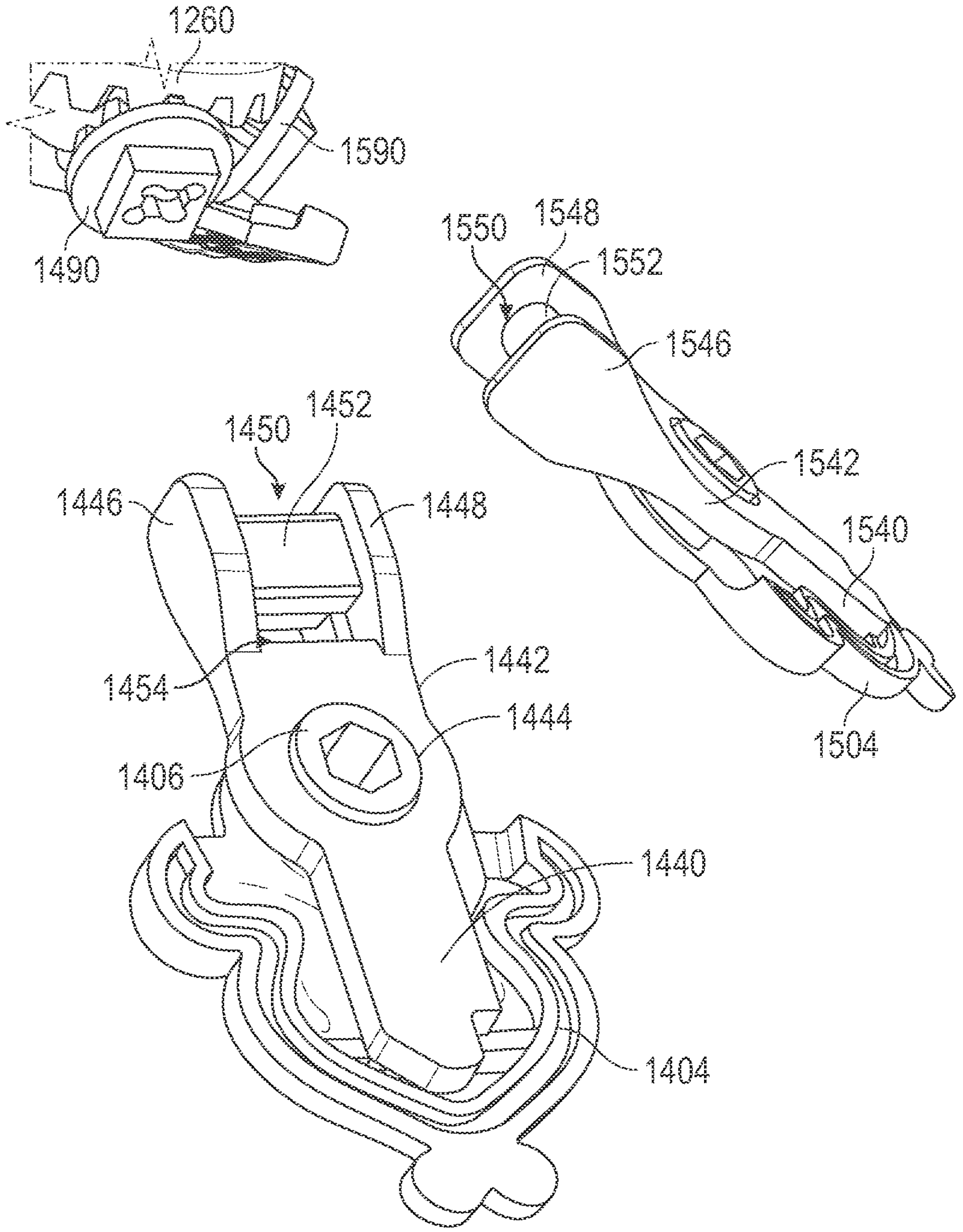
FIG. 26 illustrates a close-up perspective view of some of the components of the mechanism of FIG. 22.

Turning to FIG. 26, gears 1490 and 1590 are shown in engagement with gear 1260. In this figure, couplers 1440 and 1540 have been added back and the shafts 1410 and 1510 have been removed relative to the view shown in FIG. 25. Coupler 1440 includes a body 1442 with a hole 1444 (for post 1406 from second cover 1404). Coupler 1440 has opposite side walls 1446 and 1448 that define therebetween a channel 1450. Located in channel 1450 is a bar 1452 that is spaced from the body 1442, thereby forming an opening 1454.

Coupler 1540 includes a body 1542 with a hole for the post from second cover 1504. Coupler 1540 has opposite side walls 1546 and 1548 that define therebetween a channel 1550. Located in channel 1550 is a bar 1552 that is spaced from the body 1442, thereby forming an opening that is similar to opening 1454 for coupler 1440.

Figure 27:
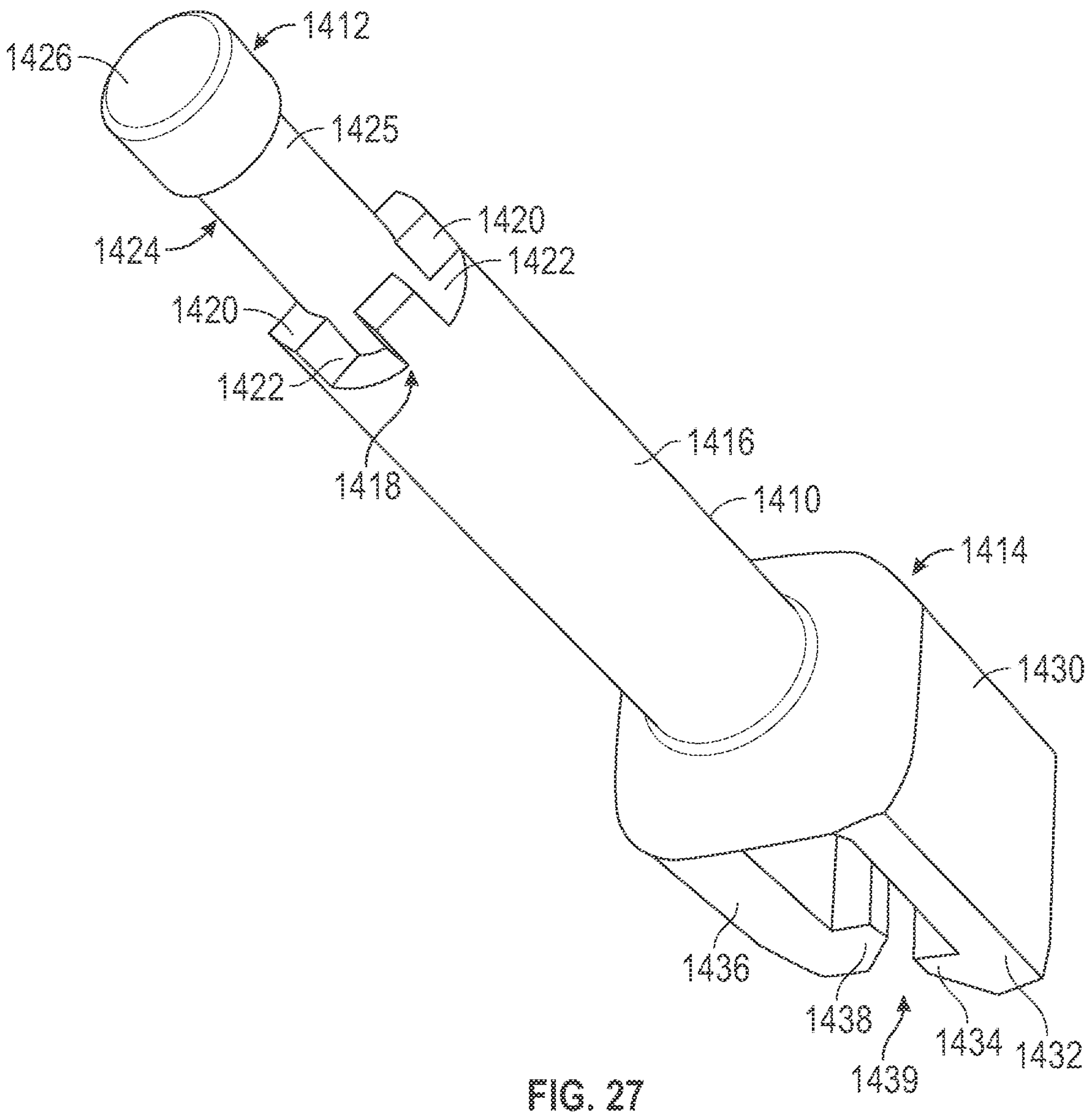
FIG. 27 illustrates a close-up perspective view of one of the components of the mechanism of FIG. 22.

Referring to FIG. 27, a perspective view of the shaft 1410 having a body 1416 is illustrated. At one end 1412 of the shaft 1410, there is a shoulder 1426 and a groove 1424 defining a portion 1425 that has a smaller outer diameter than an outer diameter the shoulder 1426. Proximate to the smaller diameter portion 1425 is an alignment portion 1418 that has alternating protrusions 1420 and notches 1422 that engage similarly alternating protrusions and notches in gear 1490, as described below. At the other end 1414 of the shaft 1410, a connector 1430 is provided. The connector 1430 includes two spaced apart arms 1432 and 1436, with arm 1432 being longer than arm 1436. Arm 1432 has a catch 1434 formed at its distal end, and arm 1436 has a catch 1438 formed at its distal end. The catches 1434 and 1438 are spaced apart from each other, thereby forming a gap 1439 therebetween.

The arms 1432 and 1436 are sized to fit in the channel 1450 between side walls 1446 and 1448 of the coupler 1440. The gap 1439 can receive the bar 1452, which can be positioned between arms 1432 and 1436. The opening 1454 is sized to receive catch 1434 of arm 1432, which couples and secures the connector 1430 to the coupler 1440.

Figure 28:
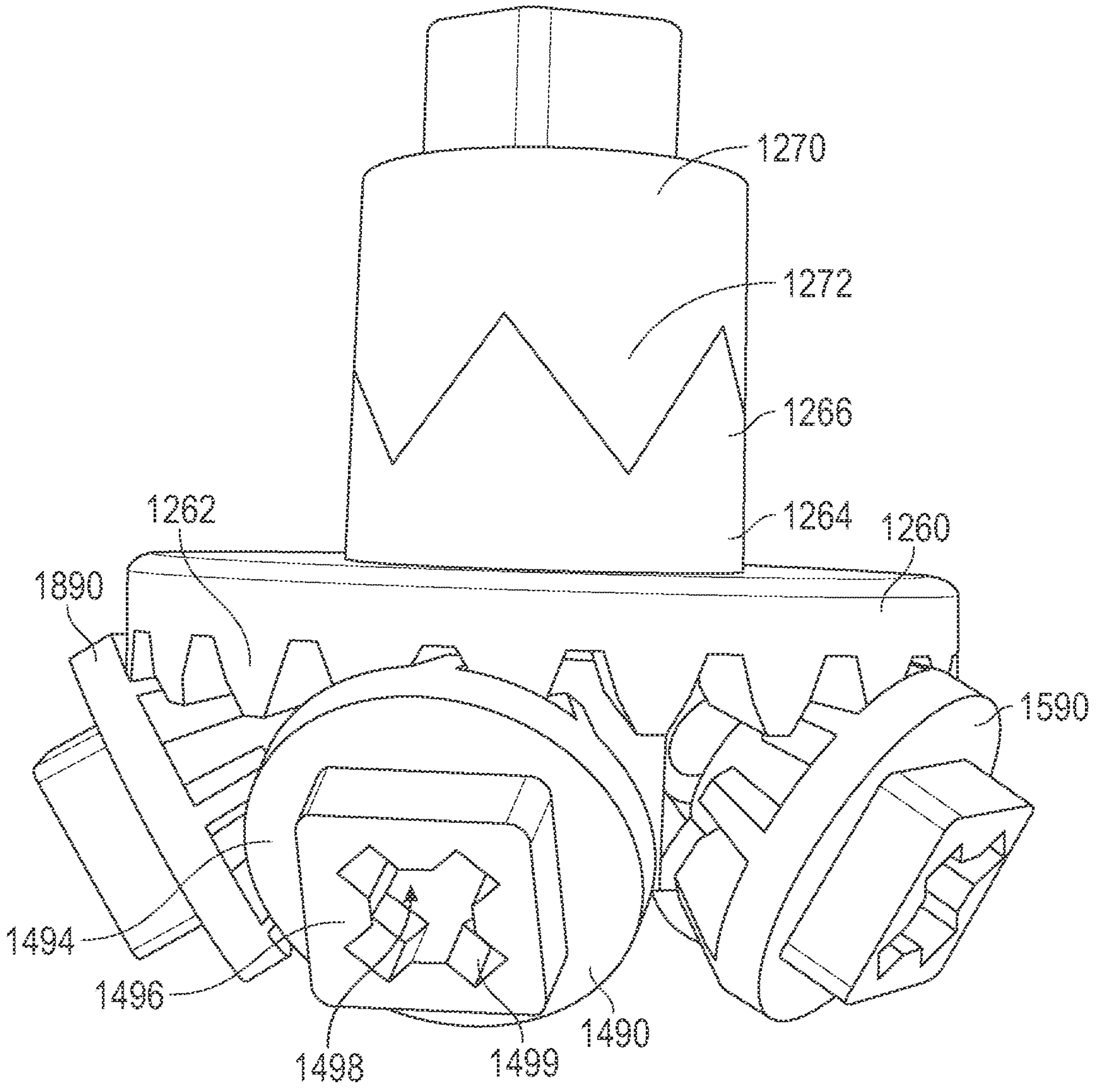
FIG. 28 illustrates a close-up perspective view of some of the components of the mechanism of FIG. 22.
Figure 29:
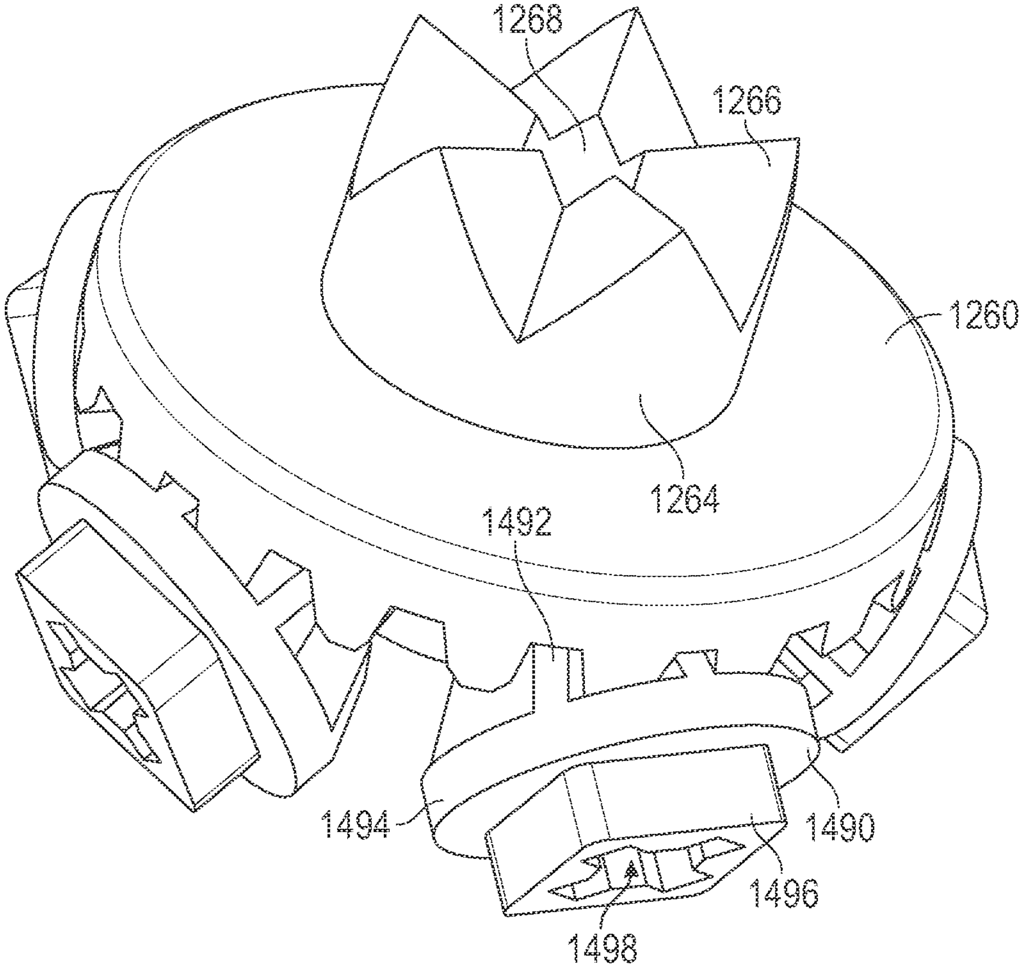
FIG. 29 illustrates a close-up perspective view of some of the components of the mechanism of FIG. 22.
Figure 30:
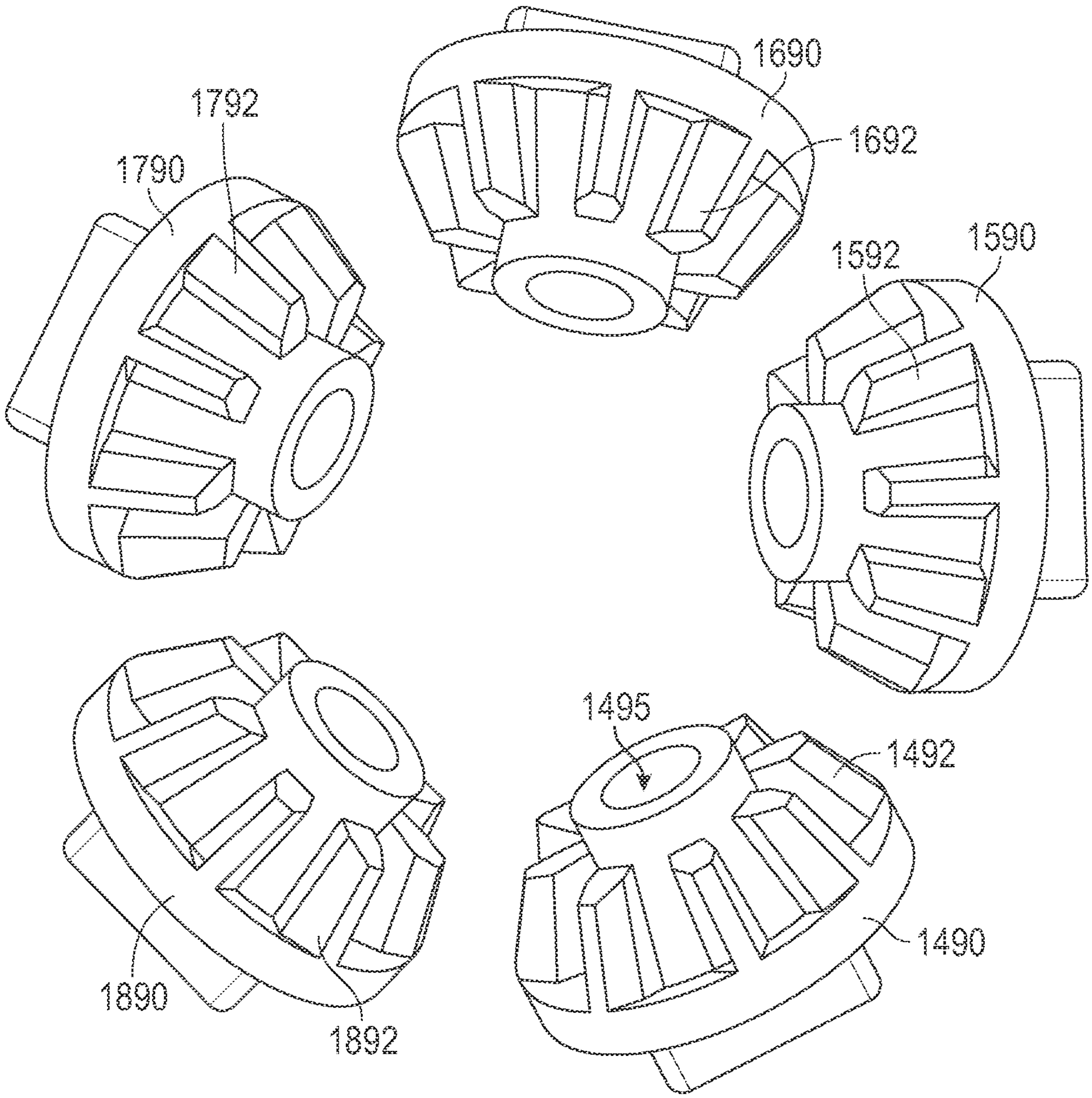
FIG. 30 illustrates a close-up perspective view of some of the components of the mechanism of FIG. 22.

Turning to FIGS. 28-30, different views of the various gears of the gear system 1225 are illustrated. Referring to FIG. 28, gear 1260 and its downward teeth 1262 are engaged with gears 1490, 1590, and 1890. On the opposite side of gear 1260 from teeth 1262 is a clutch portion 1264 with several clutch teeth 1266. The clutch gear 1270 has several clutch teeth 1272 as well. Clutch teeth 1266 are engaged with clutch teeth 1272 when the previously described spring 1284 is biasing gear 1260 into engagement with clutch gear 1270. The gear 1260 and the clutch gear 1270 allow for selective engagement and disengagement of the gear system 1225 as needed.

Gear 1490 has a shoulder 1494 with teeth 1492 located on one side of the shoulder 1494 and with extension 1496 extending away from teeth 1492. The extension 1496 includes an opening 1498 that extends through the body of the gear 1490. The opening 1498 has several notches 1499 formed therein. Each of the notches 1499 is engageable by one of the protrusions 1420 located on the shaft 1410. Gear 1490 is mounted on the distal end 1412 of shaft 1410. The body of the gear 1490 is located on the smaller diameter portion 1425 of the shaft 1410, with the shoulder 1426 retaining the gear 1490 on the shaft 1410.

Turning to FIG. 29, the clutch teeth 1266 of clutch portion 1264 of gear 1260 are shown. The clutch portion 1264 has a through hole 1268 formed through it and the gear 1260. The hole 1268 receives the axle 1282 on which the spring 1284 is mounted. Another view of gear 1490 is shown in FIG. 29 in which the teeth 1492, the shoulder 1494, the extension 1496, and the opening 1498 are illustrated.

Referring to FIG. 30, a top view of the arrangement of the apparel section gears 1490, 1590, 1690, 1790, and 1890 of toy figure 1200 is illustrated. The apparel section gears 1490, 1590, 1690, 1790, and 1890 include teeth 1492, 1592, 1692, 1792, and 1892, respectively. Each of the apparel section gears 1490, 1590, 1690, 1790, and 1890 is structured the same, including having an opening, such as opening 1495, through which the distal end of a corresponding support passes. The gears 1490, 1590, 1690, 1790, and 1890 are rotated simultaneously when gear 1260 is actuated through rotation of one of the upper portion 1210 or the lower portion 1220 relative to the other of the upper portion 1210 and the lower portion 1220.

In one embodiment of a toy figure according to the present disclosure, each apparel section rotates about its longitudinal axis 2.5 times for each time the upper portion 1210 or the lower portion 1220 makes a full rotation relative to the other of the lower portion 1220 or the upper portion 1210. Thus, the gears are configured so that the apparel sections rotate 2.5 turns (equivalent to 900 degrees) every time the upper portion 1210 or the lower portion 1220 makes a full rotation (equivalent to 360 degrees). This configuration allows the apparel sections to rotate multiple times while displaying their opposite sides during a single rotation of a portion of the toy figure, which provides a more interesting visual effect than just a simple single flip over of the apparel sections.

It is to be understood that in different embodiments each apparel section may rotate about its longitudinal axis any multiple of a half rotation (so that the apparel sections change their orientations to show a different side). The particular multiple of a half rotation is determined depending on the gear ration between the crown gear and the beveled gears connected to the apparel sections.

The movements of the components of the gear system 1225 are bi-directional. The crown gear 1260 and the beveled gears of the gear system 1225 allow the upper portion 1210 and the lower portion 1220 to rotate both clockwise and counter-clockwise relative to each other. Due to the half rotation configuration for toy figure 1200 (i.e., the 2.5 times rotation movement), the apparel sections flip from their originally upward facing sides to their opposite sides facing upward after one full rotation of the upper portion 1210 or the lower portion 1220.

Referring to FIGS. 31A-34D, illustrated are different positions of the toy figure and the apparel sections of the toy figure when the upper portion and the lower portion of the toy figure are rotated relative to each other. FIGS. 31A-32D relate to the lower portion of the toy figure being rotated relative to the upper portion of the toy figure. FIGS. 33A-34D relate to the upper portion of the toy figure being rotated relative to the lower portion of the toy figure.

Figure 31A:
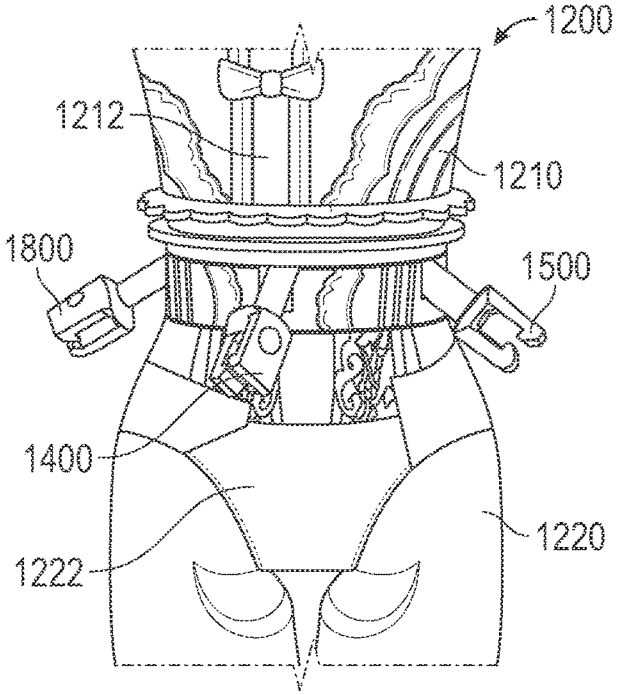
FIGS. 31A-31D illustrate different front views of a toy figure showing different stages of rotation of the lower portion of the toy figure relative to the upper portion of the toy figure.
Figure 31B:
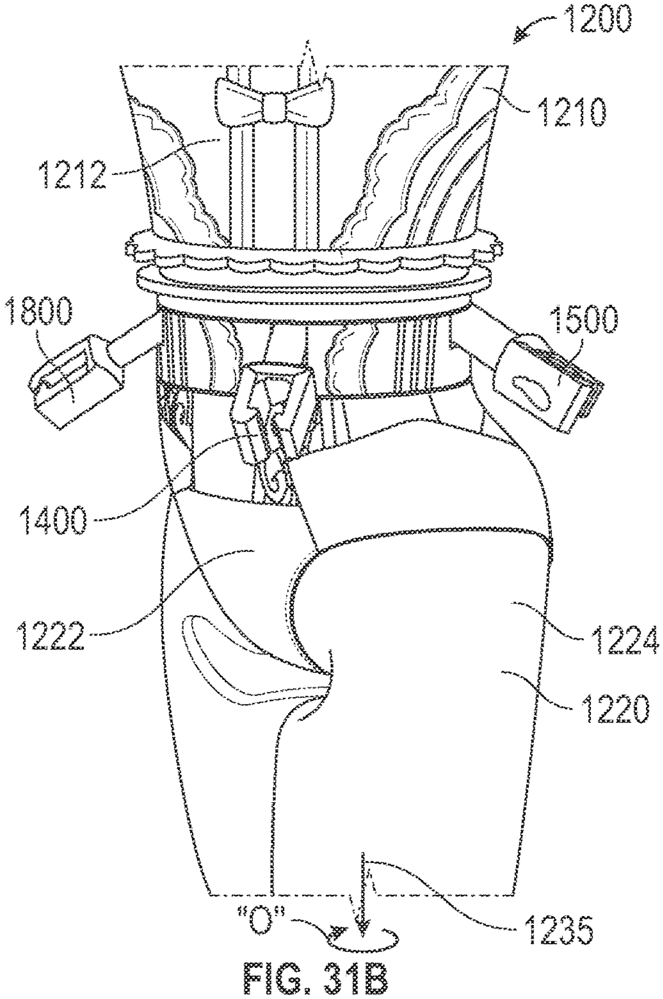
Figure 31C:
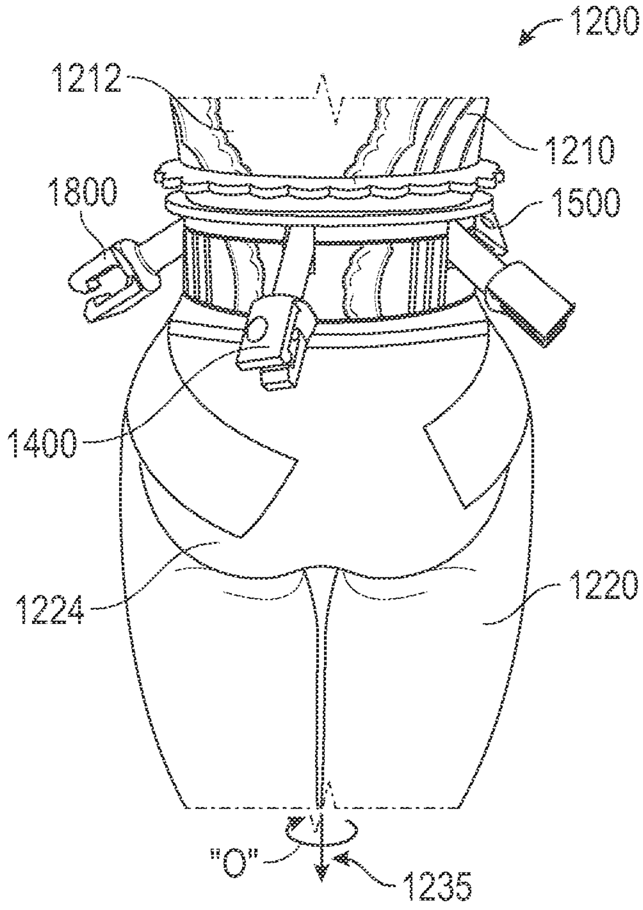
Figure 31D:
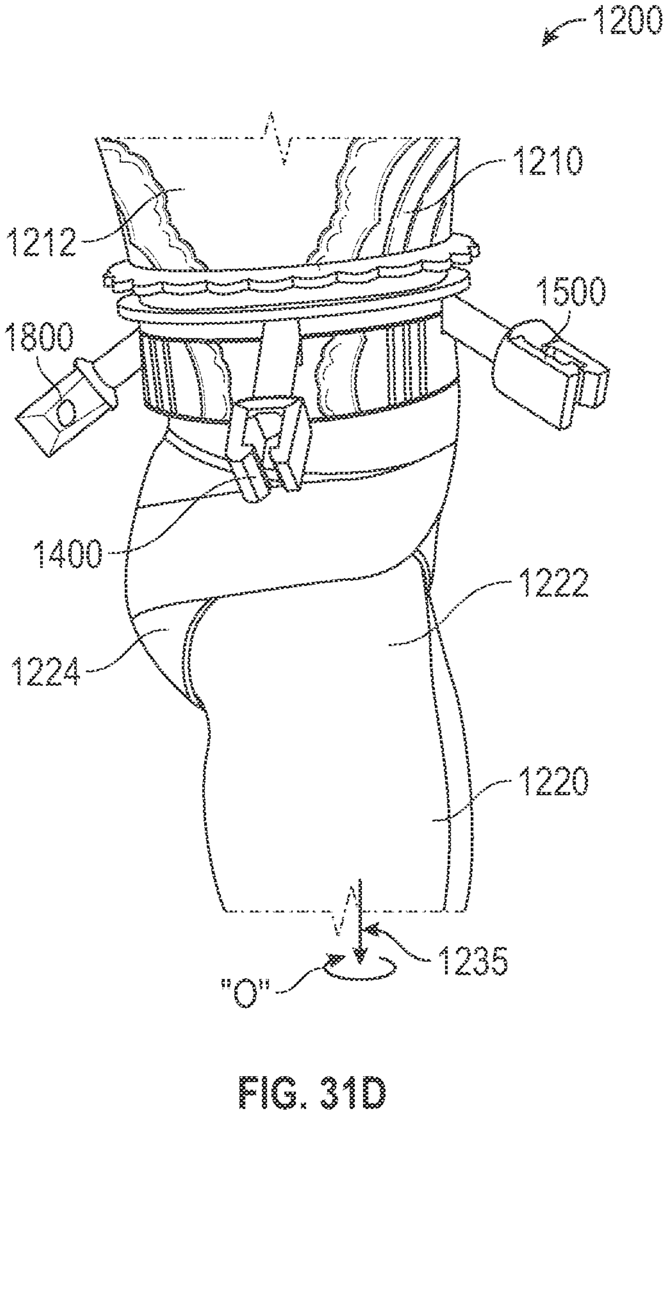
Figure 32A:
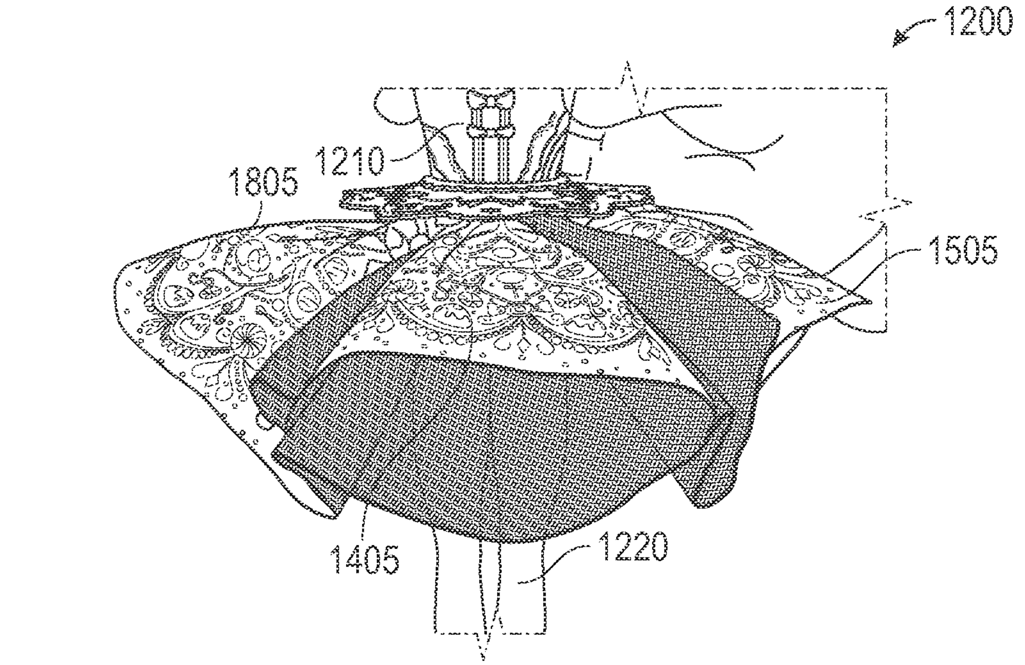
FIGS. 32A-32D illustrate different front views of the toy figure of FIGS. 31A-31D with apparel sections showing different stages of rotation of the lower portion of the toy figure relative to the upper portion of the toy figure.
Figure 32B:
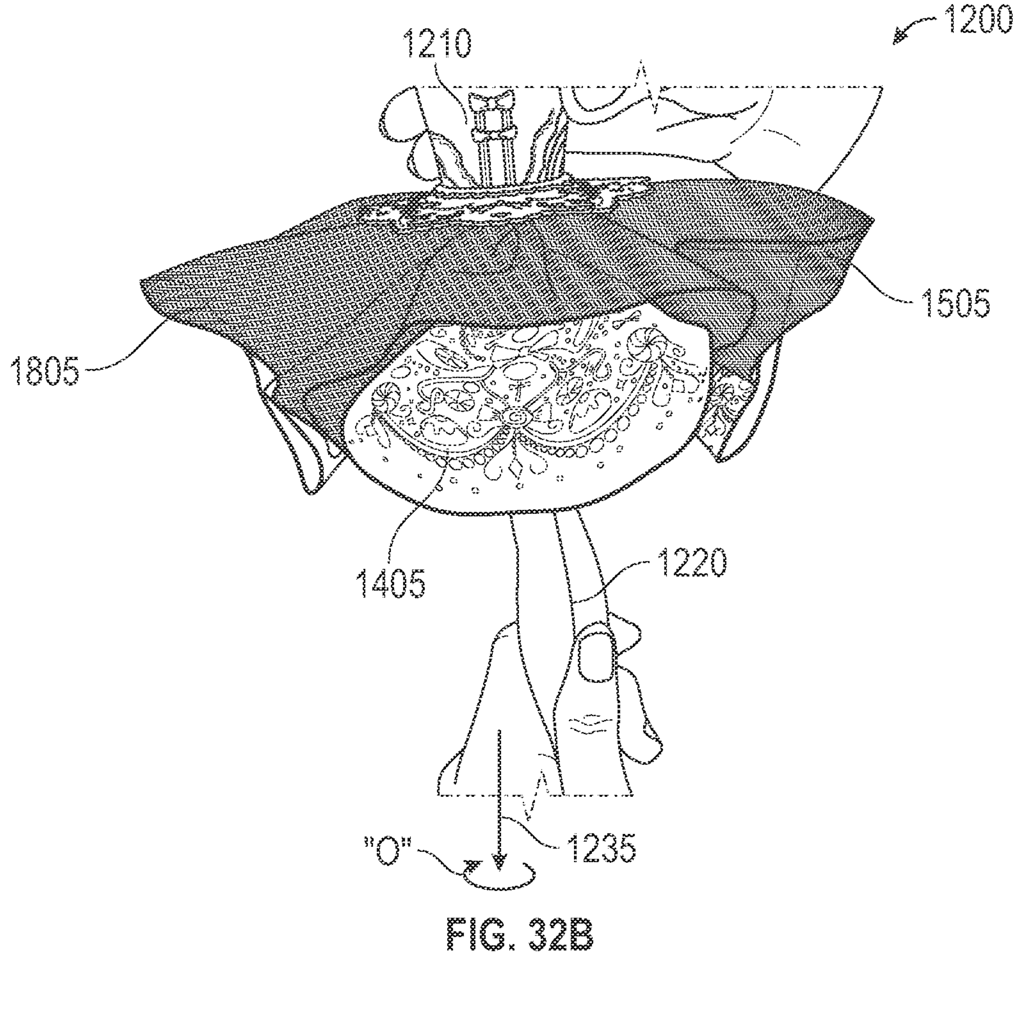
Figure 32C:
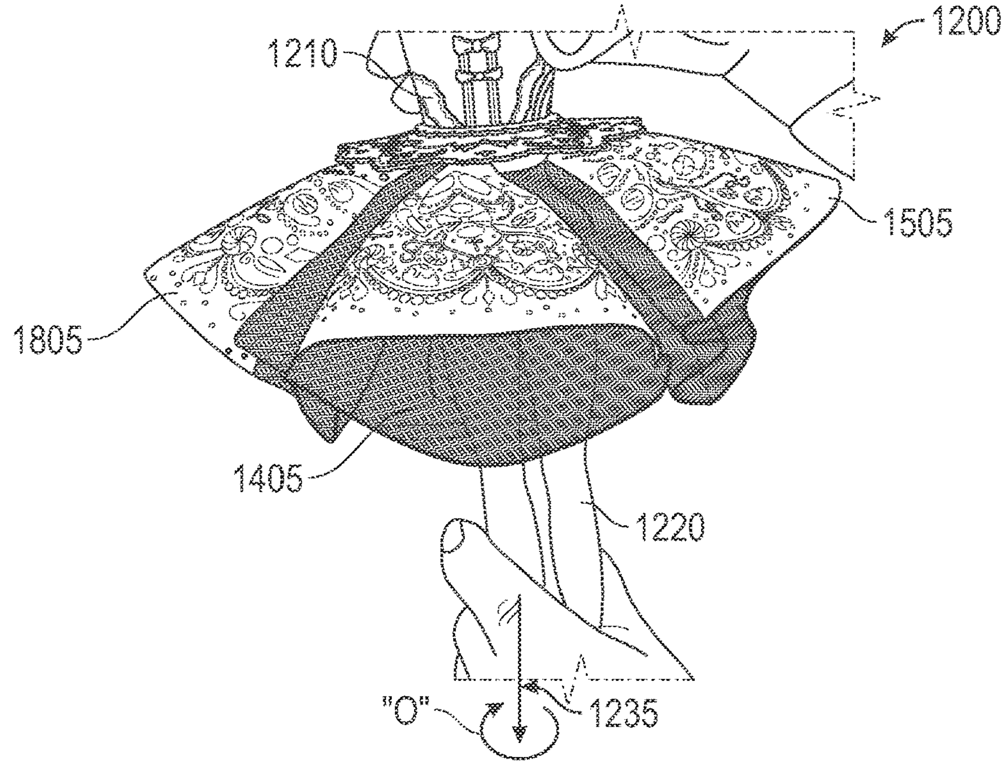
Figure 32D:
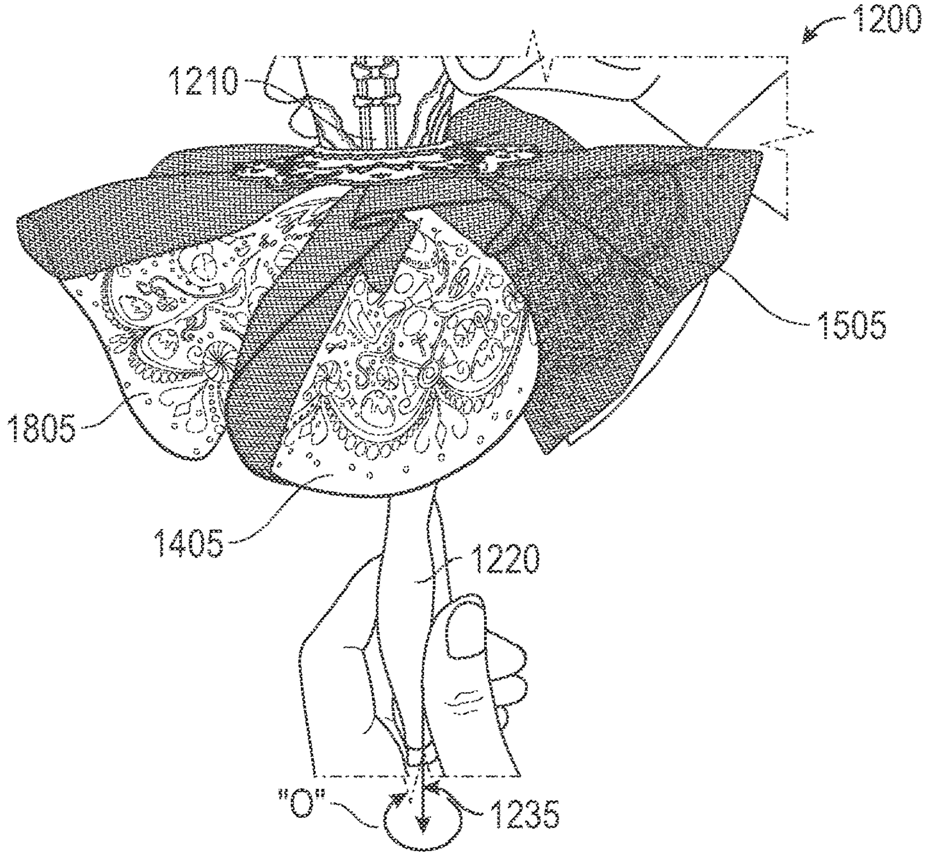

Turning initially to FIGS. 31A-31D, different positions of the toy figure 1200 when the lower portion 1220 is rotated relative to the upper portion 1210 are illustrated. As shown, in each of FIGS. 31A-31D the front side 1212 of the upper portion 1210 faces forward. In FIG. 31A, a front side 1212 of the upper portion 1210 and a front side 1222 of the lower portion 1220 are facing in the same direction (i.e., forward). In FIG. 31B, a user has rotated the lower portion 1220 along the direction of arrow "O" about a longitudinal axis 1235 of the lower portion 1220. As a result, both the front side 1222 of the lower portion 1220 and part of the rear side 1224 of the lower portion 1220 are visible. In FIG. 31C, the user has rotated the lower portion 1220 further along the direction of arrow "O" about axis 1235. In this position, the rear side 1224 of the lower portion 1220 faces forward and in the same direction in which the front side 1212 of the upper portion 1210 is facing. In FIG. 31D, the user has rotated the lower portion 1220 further along the direction of arrow "O" about axis 1235. In this view, both the rear side 1224 and the front side 1222 of the lower portion 1220 are visible.

As shown in FIGS. 31A-31D, when the lower portion 1220 rotates relative to the upper portion 1210, the supports 1400, 1500, and 1800 (including supports 1600 and 1700 which are not shown) rotate about their longitudinal axes while staying in their same horizontal positions extending from the upper portion 1210. The result is that the apparel sections coupled to the supports 1400, 1500, 1600, 1700, and 1800 rotate about their longitudinal axes as well while staying in their same horizontal positions extending from the upper portion 1210.

Turning to FIGS. 32A-32D, that particular result is illustrated as the lower portion 1220 is rotated along the direction of arrow "O" about longitudinal axis 1235 relative to the upper portion 1210. Due to the upper portion 1210 remaining fixed in place relative to the longitudinal axis 1235 in FIGS. 32A-32D, only apparel sections 1405, 1505, and 1805 are visible. Each of those apparel sections 1405, 1505, and 1805 rotates about its longitudinal axis, which is aligned with the longitudinal axis of the support to which it is coupled. In this embodiment, each of the apparel sections 1405, 1505, and 1805 has a patterned material side and an opposite solid colored material side. The patterned material side of apparel sections 1405, 1505, and 1805 is oriented upwardly in FIGS. 32A and 32C and is oriented downwardly in FIGS. 32B and 32D. The solid colored material side of apparel sections 1405, 1505, and 1805 is oriented downwardly in FIGS. 32A and 32C and is oriented upwardly in FIGS. 32B and 32D.

Figure 33A:
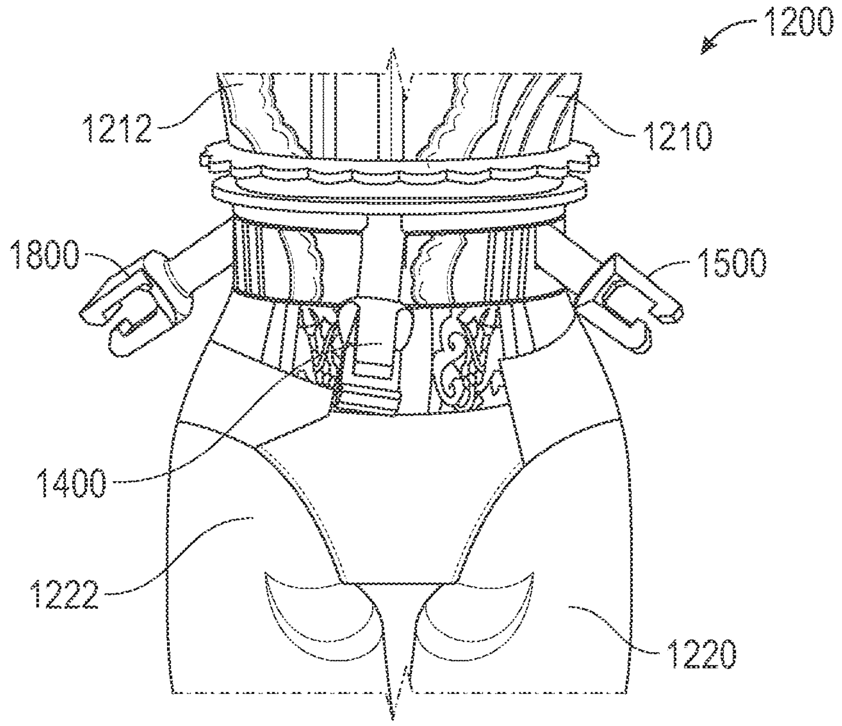
FIGS. 33A-33D illustrate different front views of a toy figure showing different stages of rotation of the upper portion of the toy figure relative to the lower portion of the toy figure.
Figure 33B:
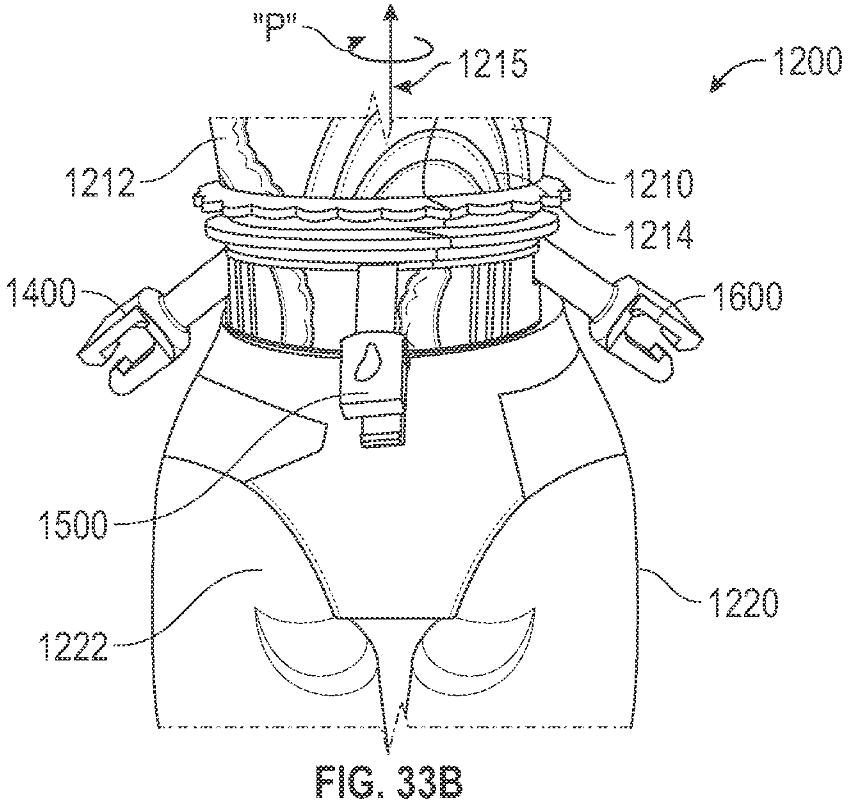
Figure 33C:
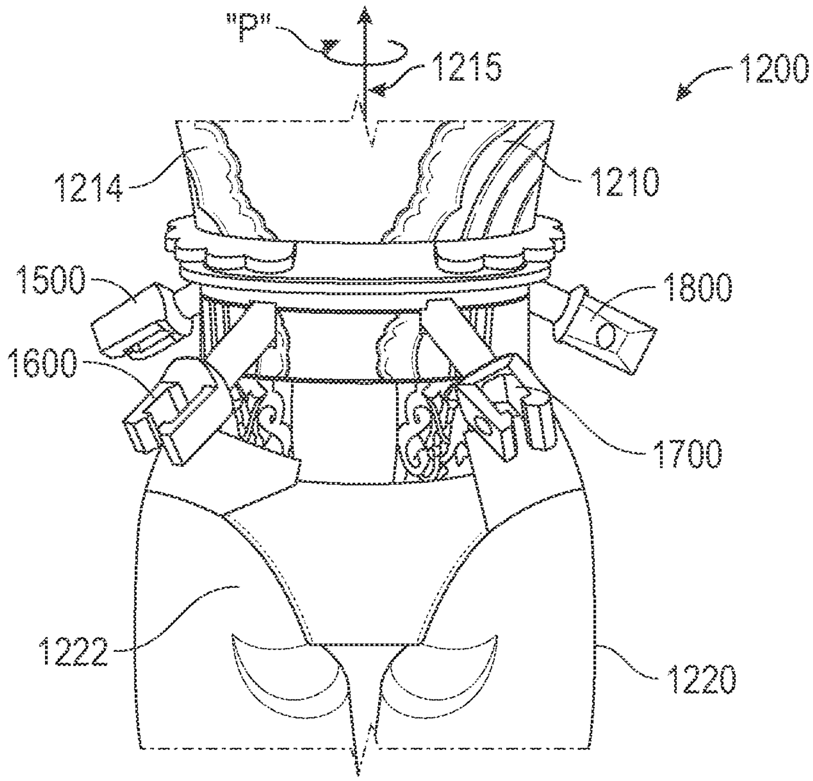
Figure 33D:
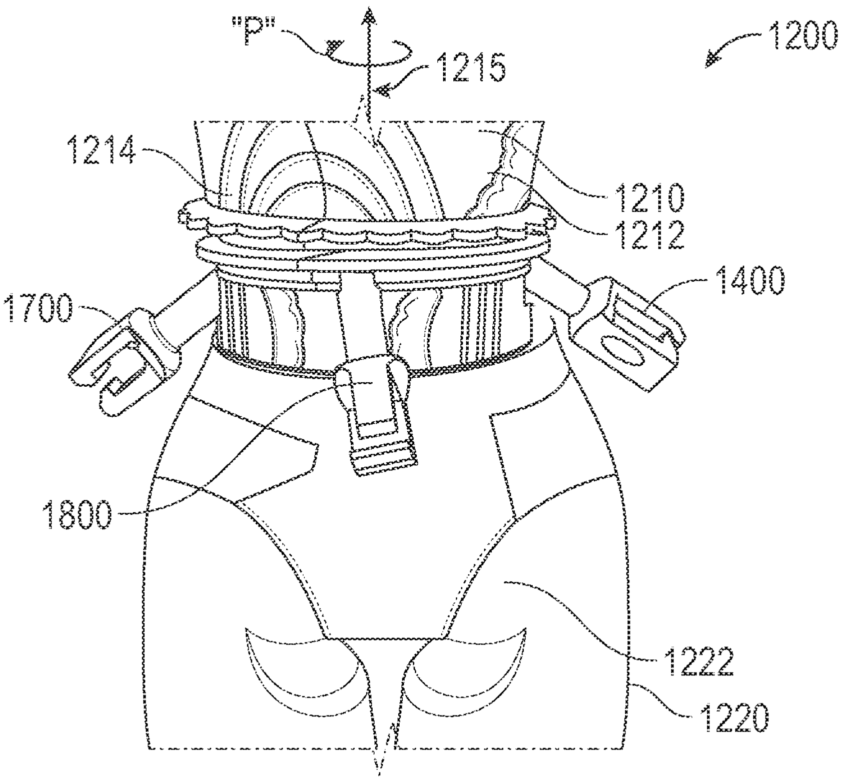
Figure 34A:
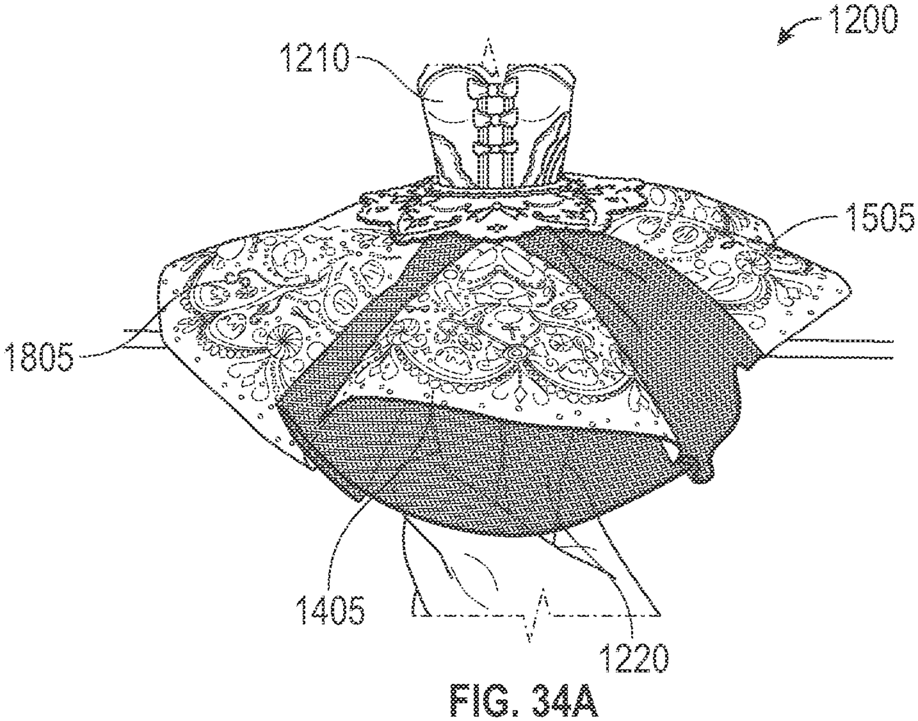
FIGS. 34A-34D illustrate different front views of the toy figure of FIGS. 33A-33D with apparel sections showing different stages of rotation of the upper portion of the toy figure relative to the lower portion of the toy figure.
Figure 34B:
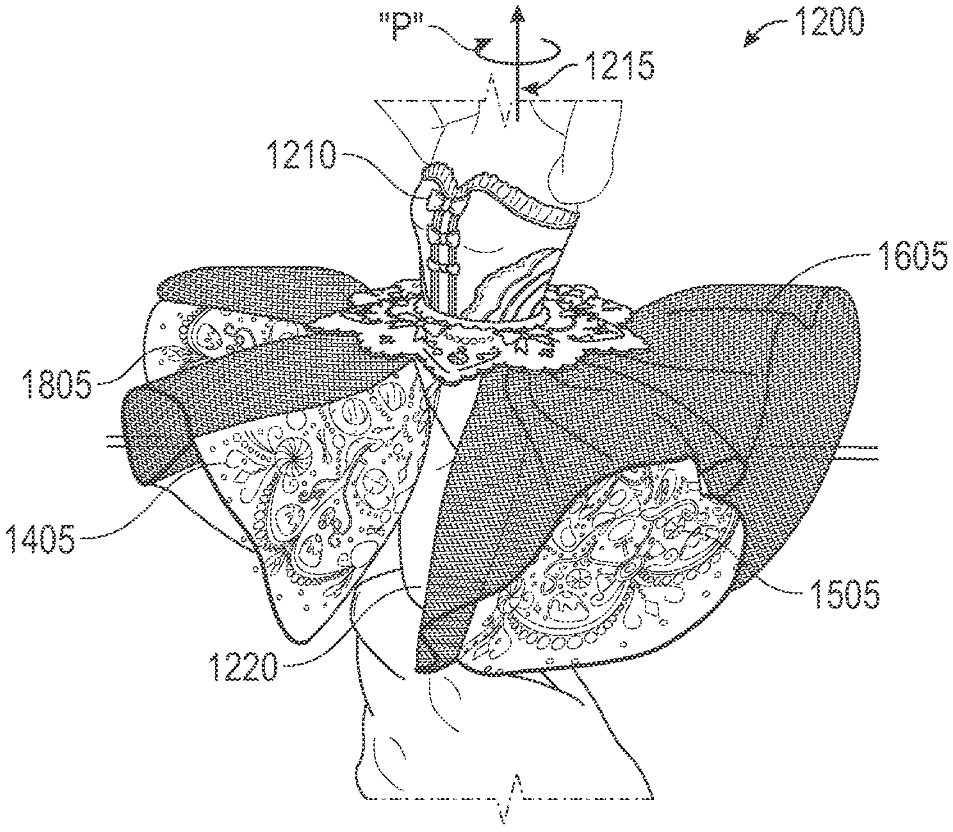
Figure 34C:
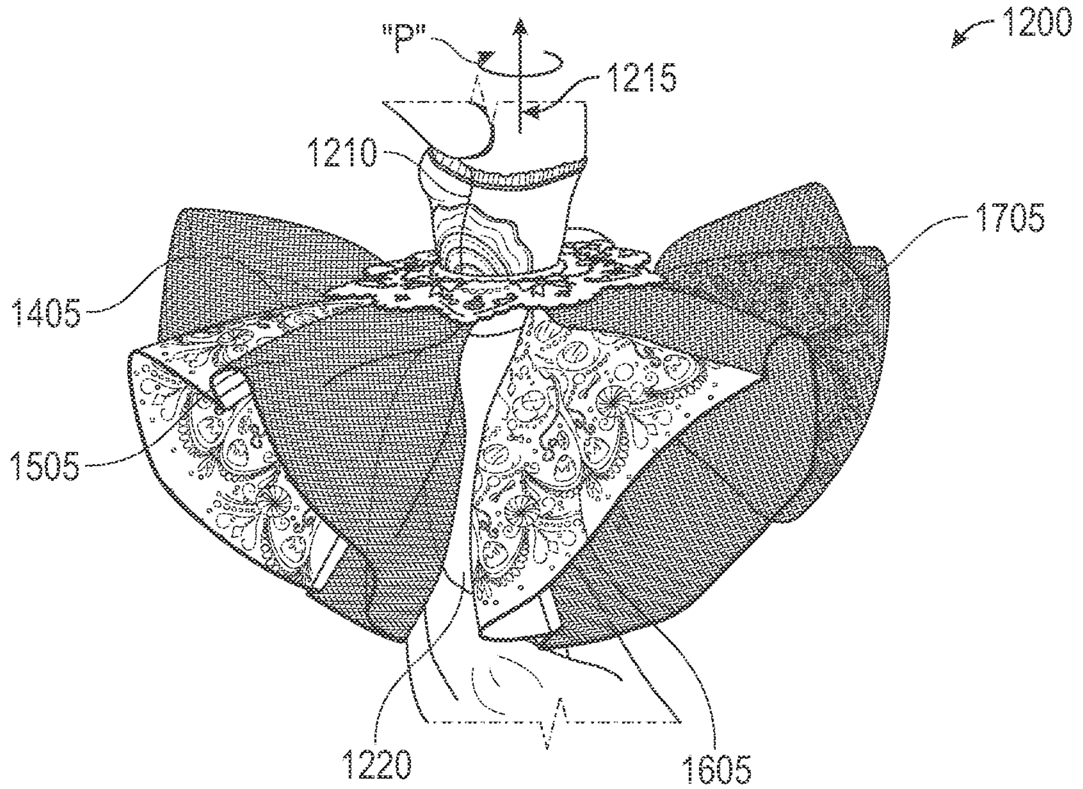
Figure 34D:
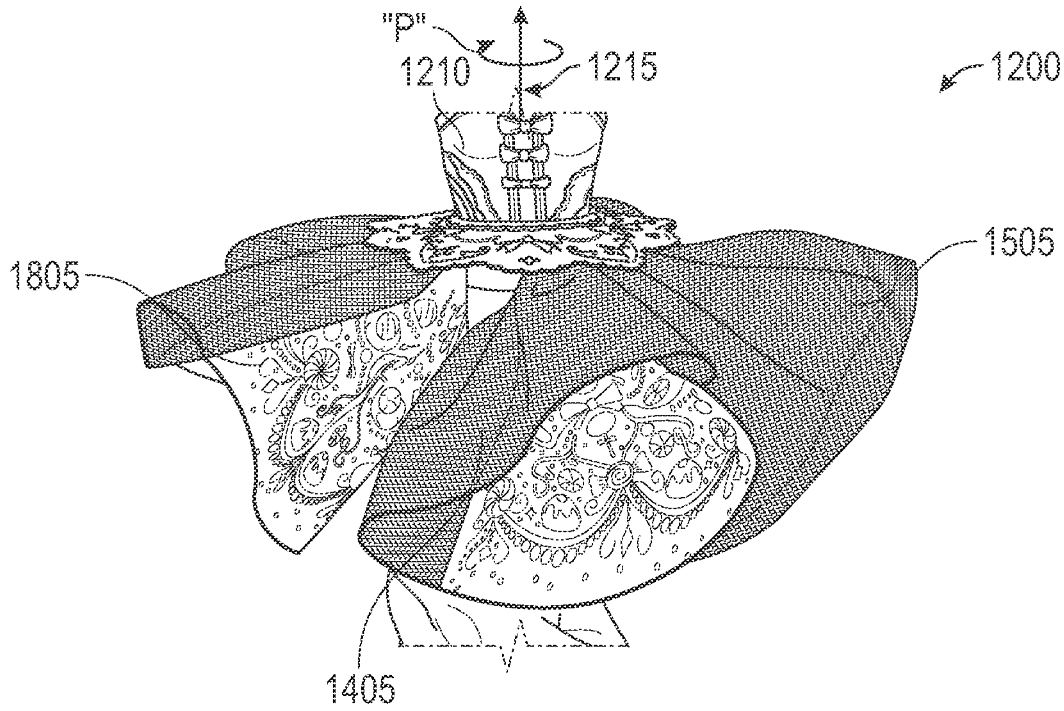

Turning the different rotational pattern in FIGS. 33A-33D, different positions of the toy figure 1200 when the upper portion 1210 is rotated relative to the lower portion 1220 are illustrated. In each of FIGS. 33A-33D the front side 1222 of the lower portion 1220 faces forward. In FIG. 33A, the front side 1212 of the upper portion 1210 and the front side 1222 of the lower portion 1220 are facing in the same direction (i.e., forward). In FIG. 33B, a user has rotated the upper portion 1210 along the direction of arrow "P" about a longitudinal axis 1215. As a result, both the front side 1212 of the upper portion 1210 and part of the rear side 1214 of the upper portion 1210 are visible. In FIG. 33C, the user has rotated the upper portion 1210 further along the direction of arrow "P" about axis 1215. In this position, the rear side 1214 of the upper portion 1210 faces forward and in the same direction in which the front side 1222 of the lower portion 1220 is facing. In FIG. 33D, the user has rotated the upper portion 1210 further along the direction of arrow "P" about axis 1215. In this view, both the rear side 1214 and the front side 1212 of the upper portion 1210 are visible.

As shown in FIGS. 33A-33D, when the upper portion 1210 rotates relative to the lower portion 1220 of the toy figure 1200, the supports 1400, 1500, 1600, 1700, and 1800 rotate about their longitudinal axes and also orbit or revolve about the longitudinal axis 1215. The result is that the apparel sections coupled to the supports 1400, 1500, 1600, 1700, and 1800 rotate about their longitudinal axes and also orbit or revolve about the longitudinal axis 1215. As the supports 1400, 1500, 1600, 1700, and 1800 and the apparel sections coupled thereto orbit or revolve about the longitudinal axis 1215, the longitudinal axis of each of the supports and its respective apparel sections also orbits or revolves about the longitudinal axis 1215.

In the view illustrated in FIG. 33A, supports 1400, 1500, and 1800 are shown. As the upper portion 1210 is rotated, the view in FIG. 33B shows supports 1400, 1500, and 1600, each of which has moved about longitudinal axis 1215 relative to lower portion 1220 and also has rotated about its own longitudinal axis. As the upper portion 1210 is rotated more in FIG. 33C, supports 1500, 1600, 1700, and 1800 are visible from the front view of toy figure 1200. Similarly, as the upper portion 1210 is rotated more in FIG. 33D, supports 1400, 1700, and 1800 are visible.

Turning to FIGS. 34A-34D, the upper portion 1210 is rotated along the direction of arrow "P" about longitudinal axis 1215 relative to the lower portion 1220. Due to the upper portion 1210 rotating in FIGS. 34A-34D, different apparel sections 1405, 1505, 1605, and 1705, and 1805 are visible in the different views. Each of those apparel sections 1405, 1505, 1605, 1705, and 1805 rotates about its longitudinal axis as the upper portion 1210 is rotated. In this embodiment, when the upper portion 1210 is rotated, the different pattern material side and the solid colored material side of each apparel section 1405, 1505, 1605, 1705, and 1805 change their orientations (facing upward or facing downward) and the positions of the apparel sections 1405, 1505, 1605, 1705, and 1805 change about the longitudinal axis 1215.

Consistent with embodiments of the present disclosure, the toy figure provides enhanced play value through transformation of apparel elements. The gear-driven system ensures synchronized rotation of all apparel sections, creating smooth transitions between different visual configurations. In various embodiments, the apparel sections may include fabric or flexible materials with different patterns, colors, or designs on opposite sides. The rotation of the apparel sections may reveal the alternative patterns, effectively changing the appearance of the toy figure.

The mechanical system may be robust and suitable for repeated use during play. The gear ratios may be selected to provide appropriate force transmission while maintaining smooth operation. In some embodiments, alignment mechanisms may ensure proper positioning of apparel sections in their final configurations. Detent mechanisms or friction elements may maintain the apparel sections in their selected positions until the next transformation is initiated.

While the toy figures presented herein have been illustrated and described in detail and with reference to specific embodiments thereof, it is nevertheless not intended to be limited to the details shown, since it will be apparent that various modifications and structural changes may be made therein without departing from the scope of the disclosure and within the scope and range of equivalents of the claims. In addition, various features from one of the embodiments may be incorporated into another of the embodiments. That is, it is believed that the disclosure set forth above encompasses multiple distinct embodiments with independent utility. While each of these embodiments has been disclosed in a preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Accordingly, it is appropriate that the appended claims be construed broadly and in a manner consistent with the scope of the disclosure as set forth in the following claims.

Additionally, it is to be understood that terms such as "first," "second," "left," "right," "top," "bottom," "front," "rear," "side," "height," "length," "width," "upper," "lower," "interior," "exterior," "inner," "outer" and the like as may be used herein, merely describe points of reference and do not limit the present disclosure to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the disclosure.

Moreover, when used herein, the term "comprises" and its derivations (such as "comprising," "includes," "including," etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". For example, the term "approximately" can denote a tolerance of plus or minus 0.002 inches, 0.001 inches, or up to 0.005 inches. The same applies to the terms "about" and "around" and "substantially." Moreover, for the purposes of the present disclosure, the phrase "A and/or B" means (A), (B), or (A and B), and the phrase "A, B, and/or C" means (A), (B), (C), (A and B), (A and C), (B and C), or (A, B and C).

What is claimed is:

1. A toy figure, comprising:

a body having an upper portion and a lower portion rotatably coupled to the upper portion, the upper portion having a longitudinal axis, the lower portion having its own longitudinal axis; and a reconfigurable apparel portion, the reconfigurable apparel portion including a first apparel section and a second apparel section, each of the first apparel section and the second apparel section having a longitudinal axis, wherein each of the first apparel section and the second apparel section is rotatable about its longitudinal axis due to rotation of one of the lower portion or the upper portion about its respective longitudinal axis relative to the other of the lower portion or the upper portion.

2. The toy figure of claim 1, wherein one of the upper portion or the lower portion includes a first gear coupled thereto, each of the first apparel section and the second apparel section includes its own gear, and teeth of the first apparel section gear and teeth of the second apparel section gear engage teeth of the first gear.

3. The toy figure of claim 2, wherein rotation of one of the lower portion or the upper portion relative to the other of the lower portion or the upper portion causes the first apparel section gear and the second apparel section gear to rotate relative to the first gear.

4. The toy figure of claim 3, wherein the first gear is a crown gear with teeth oriented downward, the first gear being coupled to the lower portion, the first apparel section gear and the second apparel section gear are beveled gears, and each of the first apparel section gear and the second apparel section gear are coupled to the upper portion.

5. The toy figure of claim 2, wherein the first apparel section includes a first rotatable support defining a first longitudinal axis, the first apparel section gear is mounted on the first rotatable support, and the first rotatable support and the first apparel section gear are rotatable about the first longitudinal axis.

6. The toy figure of claim 5, wherein the upper portion has a second longitudinal axis about which it is rotatable, the lower portion has a third longitudinal axis about which it is rotatable, and the first longitudinal axis extends relative to each of the second longitudinal axis and the third longitudinal axis at an orientation other than being either perpendicular or parallel to either of the second longitudinal axis or the third longitudinal axis.

7. The toy figure of claim 1, wherein the first apparel section has a first side with a first pattern and a second side with a second pattern, and the second pattern being different from the first pattern.

8. The toy figure of claim 7, wherein the second apparel section has a third side with a third pattern and a fourth side with a fourth pattern, and the fourth pattern being different from the third pattern, and wherein the first pattern is the same as the third pattern, and the second pattern is the same as the fourth pattern.

9. The toy figure of claim 8, wherein the first apparel section and the second apparel section rotate simultaneously with each other so that the first side is oriented upwardly when the third side is oriented upwardly.

10. The toy figure of claim 9, wherein the reconfigurable apparel portion has a first configuration in which the first side and the third side are oriented upwardly and in which the second side and the fourth side are oriented downwardly, and the reconfigurable apparel portion has a second configuration in which the second side and the fourth side are oriented upwardly and in which the first side and the third side are oriented downwardly.

11. The toy figure of claim 10, wherein when the upper portion and the lower portion are in a first arrangement, the reconfigurable apparel portion is in its first configuration, and when one of the lower portion or the upper portion is rotated a full revolution relative to the other of the lower portion or the upper portion, the upper portion and the lower portion are in a second arrangement in which the reconfigurable apparel portion is in its second configuration.

12. The toy figure of claim 11, wherein the reconfigurable apparel portion includes a third apparel section, a fourth apparel section, and a fifth apparel section, each of the first apparel section, the second apparel section, the third apparel section, the fourth apparel section, and the fifth apparel section is mounted to the upper portion and located around a perimeter of the body of the toy figure, and the first apparel section, the second apparel section, the third apparel section, the fourth apparel section, and the fifth apparel section collectively form clothing for the toy figure.

13. The toy figure of claim 1, wherein when the lower portion rotates about its longitudinal axis relative to the upper portion, each of the first apparel section and the second apparel section rotates about its longitudinal axis and does not revolve around the longitudinal axis of the lower portion, and when the upper portion rotates about its longitudinal axis relative to the lower portion, each of the first apparel section and the second apparel section rotates about its longitudinal axis and revolves around the longitudinal axis of the lower portion as well.

14. A toy figure, comprising:

an upper body portion having a longitudinal axis;

a lower body portion rotatably coupled to the upper body portion, the lower body portion having its own longitudinal axis; and a reconfigurable apparel portion coupled to one of the upper body portion and the lower body portion, the reconfigurable apparel portion including apparel sections, each apparel section including a support and a material coupled to its support, each support defining a longitudinal axis about which that support and its respective material rotates, and each apparel section rotates about its longitudinal axis when one of the lower body portion or the upper body portion rotates about its respective longitudinal axis relative to the other of the lower body portion or the upper body portion.

15. The toy figure of claim 14, wherein the lower body portion has a crown gear coupled thereto, each apparel section has a beveled gear coupled its respective support, and each apparel section beveled gear engages the lower body portion crown gear.

16. The toy figure of claim 15, wherein rotation of one of the lower body portion or the upper body portion relative to the other of the lower body portion or the upper body portion causes each of the apparel sections to rotate about its longitudinal axis simultaneously with other apparel sections rotating about their longitudinal axes.

17. The toy figure of claim 16, wherein rotation of the upper body portion about its longitudinal axis relative to the lower body portion causes each of the apparel sections to revolve around the longitudinal axis of the lower body portion as well.

18. The toy figure of claim 16, wherein each apparel section material includes a first side with a first pattern and a second side with a second pattern, the second pattern being different from the first pattern, and each apparel section rotates simultaneously with other apparel sections so that a first side of each apparel section is oriented in a same direction as the first sides of other apparel sections.

19. A toy figure, comprising:

an upper body portion defining a longitudinal axis;

a lower body portion rotatably coupled to the upper body portion; and a reconfigurable apparel portion including a plurality of apparel sections, each apparel section including a support with a gear mounted thereon and a multiple-sided material coupled to the support, each support defining its own longitudinal axis about which its respective multiple-sides material rotates, each apparel section rotating about its longitudinal axis when one of the lower body portion or the upper body portion rotates relative to the other of the lower body portion or the upper body portion, and each apparel section revolves about the longitudinal axis of the upper body portion when the upper body portion rotates relative to the lower body portion.

20. The toy figure of claim 19, wherein material of each apparel section includes a first side with a first pattern and a second side with a second pattern, the second side being opposite the first side, and the second pattern being different from the first pattern, and the first side of each apparel sections is oriented in a same direction as the first sides of other apparel sections when the plurality of apparel sections rotate.

* * * * *